Sept. 22, 1959   E. J. DIEBOLD   2,905,884
ELECTROMAGNETIC RECTIFIER
Filed Dec. 12, 1955   7 Sheets-Sheet 1

INVENTOR.
EDWARD JOHN DIEBOLD
BY *Ostrolenk, Faber,*
*Gerb & Soffen*
ATTORNEYS

Sept. 22, 1959  E. J. DIEBOLD  2,905,884
ELECTROMAGNETIC RECTIFIER
Filed Dec. 12, 1955  7 Sheets-Sheet 3

INVENTOR.
EDWARD JOHN DIEBOLD
BY Ostrolenk, Faber,
Gerb & Soffen
ATTORNEYS

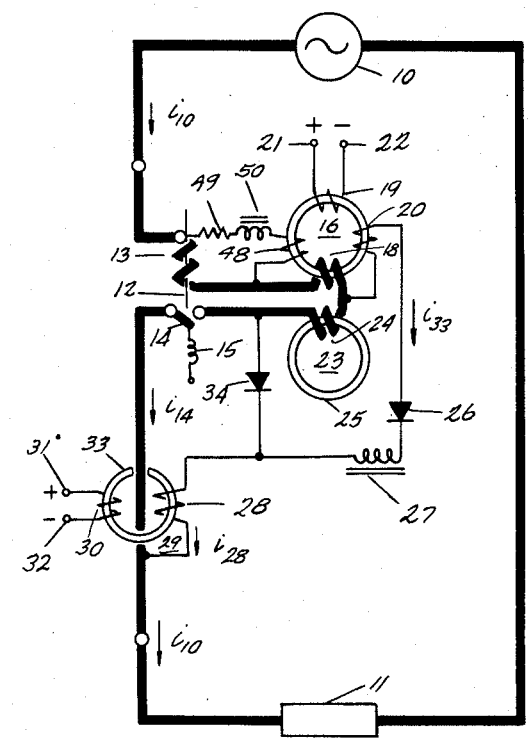
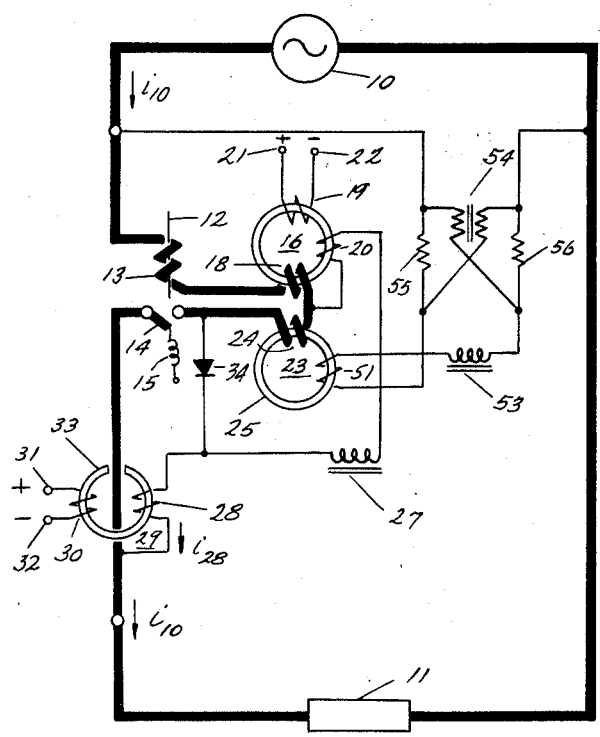
FIG. 7
FIG. 8
INVENTOR
EDWARD JOHN DIEBOLD
ATTORNEYS

Sept. 22, 1959     E. J. DIEBOLD     2,905,884
ELECTROMAGNETIC RECTIFIER
Filed Dec. 12, 1955     7 Sheets-Sheet 5

INVENTOR.
EDWARD JOHN DIEBOLD
ATTORNEYS

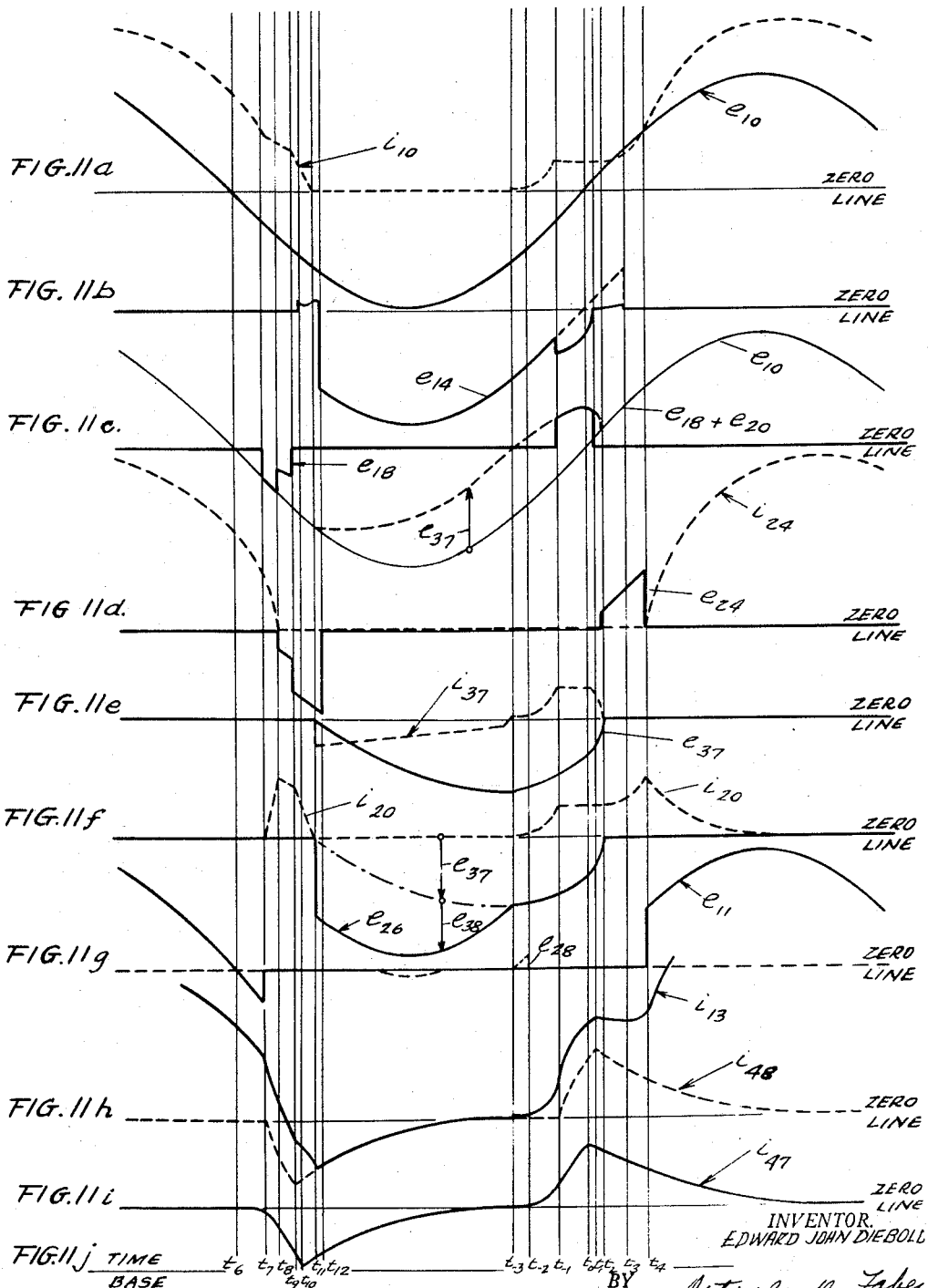

Sept. 22, 1959     E. J. DIEBOLD     2,905,884
ELECTROMAGNETIC RECTIFIER
Filed Dec. 12, 1955     7 Sheets-Sheet 7

INVENTOR.
EDWARD JOHN DIEBOLD
BY Ostrolenk, Faber,
Gerb & Soffen
ATTORNEYS

United States Patent Office 2,905,884
Patented Sept. 22, 1959

2,905,884

ELECTROMAGNETIC RECTIFIER

Edward John Diebold, Ardmore, Pa., assignor to I-T-E Circuit Breaker Company, Philadelphia, Pa., a corporation of Pennsylvania Application December 12, 1955, Serial No. 552,562

17 Claims. (Cl. 321—48)

My invention relates to a new circuitry for electromagnetic rectifiers and more specifically to a new circuitry which is based on the understanding of inherent problems which have not been understood heretofore.

The basic theory of an electromagnetic rectifier is as follows: A ferromagnetic and electrically conductive body of small size is moved by electromagnetic forces between magnet poles which also serve as fixed electrical conductors. Magnetization of the poles attracts the movable body to establish an electrical circuit when the movable body engages the magnet poles.

Demagnetization of the poles then releases the movable body which is subsequently carried away by a biasing means which can be a spring or another magnetic field. Electric current which flows through the circuit established by the movable body is used to produce the magnetic field holding it against the poles and loss of this current will cause the release of the body.

A small auxiliary current which does not flow through the circuit established by the movable body is used to build up the magnetic field required to close this circuit. Control of the time at which the small auxiliary current rises affords control of the large current flowing in the circuit established by the movable body.

Electromagnetic rectifiers operating according to the above stated principles have been described in my U.S. Patent No. 2,756,380, issued July 24, 1956 entitled "Electromagnetic Switch," to E. J. Diebold and assigned to the assignee of the present invention. The electromagnetic switch which supplies the above-mentioned magnetic poles and current carrying armature to which the circuitry described hereinafter can be applied, is shown in U.S. Patent No. 2,805,300, issued September 13, 1957 entitled "Electromagnetic Contact Device," to E. J. Diebold and Elmer Goessel and assigned to the assignee of the present invention.

Severe problems have confronted the development of the electromagnetic rectifier in the past such as the rectifier shown in the above-mentioned U.S. Patent No. 2,756,-380 because of a mistaken assumption as to the operation of the mechanical switch. That is, in the past, it was implicitly assumed that the mechanical requirements for electromagnetically operated contacts are simple and that they are satisfied to a degree that their existence could be ignored by the practical contacts. Hence, no effort was made to compensate for the mechanical shortcomings by an adequate design of the electrical circuitry. In fact, conditions governing the design of the electrical commutation circuits were based on the rules established with mechanical rectifiers such as the rectifier shown in U.S. Patent No. 2,759,141, issued August 14, 1956 entitled "Regulator for Mechanical Rectifier," to E. J. Diebold and assigned to the assignee of the present invention which have contacts roughly one thousand times heavier than the electromagnetic rectifiers and are operated mechanically instead of by electromagnetic fields.

Practical experience, however, shows that these assumptions are not justified but have to be replaced by a new concept of an electromagnetic rectifier.

Conditions derived from past experience express the problems which must be solved by the electrical circuit operating in conjunction with the contact and these conditions are as follows:

(1) Glow discharge between approaching or separating contacts will start whenever the most favorable distance is reached, i.e., when the gap separating the contact surfaces is equivalent to approximately the mean free path of the gas molecules between them. The smallest voltage causing a glow-discharge in the air is approximately 280 volts and the favorable distance for atmospheric air is 0.000300". Increasing the pressure will decrease the favorable distance, but will not increase the smallest voltage as by the Law of Paschen. Contacts should not approach the critical distance at a voltage equal or higher than the minimum glow-discharge voltage, because the glow-discharge will cause an arc which is destructive for the contact material.

(2) Capacitive energy is stored between adjacent contacts, the conductors and other components connected to them, and will be liberated instantaneously at the make of the contacts. If this energy is in excess of two ergs (200 billionths of a watt second), it will be a cause of transfer of matter which will destroy the contacts after a certain number of operations. This is particularly dangerous if spark-extinguishing capacitors are connected across the contact. It is also dangerous for normal contacts due to the increase of capacity while contacts are approaching if the voltage charging this increasing capacitance is too high. In the practical case, if voltage across closing contact at the closing instant is lower than ten volts, the field discharge of electrons which is the cause of damage will not occur and therefore no transfer of matter is experienced. At higher voltages field discharge occurs when the contacts have approached a distance varying between 10 to 100 microinches due to the excessively high voltage gradient existing between them.

Volume of matter transferred due to field-discharge which leads to ultimate contact destruction, is proportional to the discharge capacity and the square of the break-down voltage.

(3) The discharge time-constant of the distributed capacitances and eventually used spark-extinguisher-parallel path, determines the time duing which voltage must be kept at the minimum voltage specified under condition 2.

(4) Velocity between contacts during the make process should be at least twenty inches per second. A lower velocity means a longer transition time during which the contact resistance is finite and more heat will be developed in the contact surface.

(5) Make inrush current should be less than 0.2 ampere, the limit for no transfer of matter during contact separation or break. That is to protect the contact in case of bounce.

(6) Rate of rise of contact current, immediately after make, should be less than ten amperes per second. This will limit the amount of current interrupted in case of contact bounce.

(7) Make step length or the time during which condition 6 must be satisfied, should be longer than eighty microseconds to cover all possible bouncing.

(8) Current through the contact immediately before and during the break should be less than 0.2 ampere. Break-current will cause contact material to melt. The molten bridge formed has an unequal temperature distribution due to Thompson-Peltier effect and this results in transfer of matter. The amount of matter transferred becomes negligible if the above condition is satisfied since the volume of matter transferred is proportional to the cube of the residual current. This condition, however, as stated, limits the transfer to an amount too small to damage the contact after approximately one billion operations.

(9) Break current should be opposite in direction to eventually occurring back-fire current. In case of an incorrect break an arc will be drawn which will eventually extinguish when the current in the arc reverses. Not satisfying this condition results in a back-fire whenever an unusual break operation occurs (start, stop, variation of primary voltage, short-circuit of load, etc.).

(10) Energy stored in the magnetic fields around the main conductors, should be dissipated before the actual break occurs. In the practical case, a time interval of 20 microseconds before the break during which the current is kept at a low value will satisfy this condition.

(11) Velocity of separation of the contacts at the break should be at least twenty inches per second. This assures steady operation without reclosing bounce and limits the amount of material transferred by the residual current flowing through the contact during the break.

(12) Recovery voltage appearing instantaneously at the break should be less than twelve volts, which is the minimum voltage required to maintain an arc between the practically used contact materials such as silver, gold, platinum, palladium, nickel, tungsten and others or alloys thereof.

(13) Rate of rise of the recovery voltage between the contact surfaces should be less than 100,000 volts per second. This is to prevent a restrike of an arc during the separation of the contacts.

(14) Deionization time during which the above condition must be satisfied should be approximately 100 to 200 microseconds. This actually depends on the amount of ionization available at the break, and therefore on the way the other conditions are satisfied.

Of the above conditions, numbers 2, 3, 5 and 11 are completely new and express a method of approach which was, up to now, not followed. Condition 4 is radically changed as it was inadequately expressed before. Most of these increased restrictions are due to the presence of contact bounce which cannot be eliminated with any degree of certainty and therefore is always assumed to be present, even if its occurrence is only sporadic.

In addition to the conditions expressed above which are specific to the contacts themselves, another set of conditions have been established pertaining to the rectifier circuitry in general. Although they are not physically rigorous, practical experience has proved them to be necessary.

(15) A circuit operating in conjunction with electromagnetically operated contacts should be self-governing and self-controlling to assure correct operation instantaneously and under all circumstances.

(16) There should be compensation for additional voltage drop of parallel circuits and drive-magnet, assuring a higher output voltage for the same circuit elements and a higher power factor for the input power.

(17) Operation of rectifier should cease in a sharp cut-off when load current is less than the limit required by the magneto-motive force of the drive magnet. A parallel circuit should carry the current below this limit.

(18) Make and break operations should be, as much as possible, identical, except occurring in inverse sequence. This will permit use of the same elements twice during each cycle and automatically correct operation in case of a faulty or insufficient previous operation.

(19) Operation in case of back fire should be sufficiently safe to prevent gross damage and keep equipment in workable condition until protective equipment trips.

A review of the above mentioned conditions will emphasize the importance of low voltage across the contacts during the time the contacts engage.

I now propose the use of a novel circuit which will assure a low make voltage under all conditions. This novel make pre-excitation circuit will in fact now become a basic component of any electromagnetic rectifier in much the same manner as the electromagnetic switch, commutating reactor and by-pass circuit are basic components.

The principle of this novel invention is to provide a make pre-excitation circuit which will work in conjunction with a conventional by-pass circuit and comprise an electrical valve or diode which is connected in parallel with the electro-magnetic switch contacts and in series with the commutating reactor. In the case of electromagnetic rectifiers employing voltage control by delaying the initiation of by-pass circuit current, my novel make pre-excitation circuit will be connected in series with the regulating means and the series connection of the make pre-excitation circuit and regulating means will then be connected across the electromagnetic switch contacts.

The operation of this combination will then allow the conventional type of by-pass circuit to energize the contact closing while my novel make pre-excitation circuit will be so connected as to drain current through the commutating reactor to thereby have the commutating reactor unsaturated or in its step at the time the by-pass circuit closes the contacts. Therefore, at the time contact engagement occurs, the voltage across the contact will be the forward voltage drop due to the low step current of the commutating reactor across the parallel connected diode which comprises my novel make pre-excitation circuit and which is of only a negligible amount. Furthermore, the commutating reactor will be unsaturated and in its step at the closing time and can therefore be so biased that the step current which is the inrush current to the contact is either zero or a very small amount.

It should be noted that in the prior art devices, the closing of the contact initiated the unsaturation of the commutating reactor. Hence, contact inrush current was inherent since the commutating reactor went from a static condition to a dynamic condition. It is well known in the art that there is no practical method of compensating for this inherent inrush current.

However, the use of my novel make pre-excitation circuit places the commutating reactor in its dynamic condition before contact engagement and therefore allows the use of compensation circuits or biasing circuits to make the contact inrush current either zero or a very small value.

Accordingly, a primary object of my invention is to provide circuitry for an electromagnetic switch which will maintain the voltage across the switch contacts at a low or zero value during the time the contacts engage and disengage.

Another object of my invention is to provide a make pre-excitation circuit which will be connected across the contacts of an electromagnetic switch and comprises a diode which could be in series with a regulating means and acts to unsaturate the commutating reactor before the electromagnetic switch contacts engage.

Still another object of my invention is to provide a make pre-excitation circuit for electromagnetic rectifiers which comprises a diode connected across the electromagnetic switch contacts such that the voltage across the electromagnetic switch contacts when they engage is only the forward voltage drop of the diode.

A further object of my invention is to provide a make pre-excitation circuit which will place the commutating reactor in a dynamic magnetic condition prior to engagement of the electromagnetic switch contacts to allow zero compensation of the current through the commutating reactor at the instant contact engagement takes place.

A still further object of my invention is to provide circuitry for an electromagnetic rectifier which will maintain the instantaneous contact current during contact engagement at a very low or zero value.

A still further object of my invention is to provide a make pre-excitation circuit which will work in conjunction with a conventional by-pass circuit such that the commutating reactor will be unsaturated before the by-pass circuit causes contact engagement of the electromagnetic switch and the voltage drop across the electromagnetic switch at the point at which it engages will be negligible.

Yet another object of my invention is to provide a combination of a by-pass circuit in conjunction with a novel make pre-excitation circuit such that the make pre-excitation circuit will cause unsaturation of the commutating reactor after a regulating means allows energization of both the by-pass circuit and the make pre-excitation circuit to subsequently cause contact engagement under substantially zero voltage conditions.

Electromagnetic rectifiers can use regulators which normally comprise a saturable type reactor such as is shown in co-pending application Serial No. 257,398. After the regulator is unsaturated to allow the flow of by-pass current, a voltage drop will appear across the engaging contacts which is due to the voltage drop on the resistance and air inductance of the parallel connected regulator coil, this voltage drop being the product of the relatively high by-pass circuit current and the resistance and air inductance of the saturated regulator coil.

In many applications, this voltage drop can become excessively large and can eventually cause severe contact deterioration. It was pointed out above that the presence of a voltage drop across the contacts at the time of make is a severe limitation for electromagnetic rectifiers. By now using the above-mentioned make pre-excitation circuit as a basic element of an electromagnetic rectifier, I can now provide a novel compensation circuit which will compensate for the voltage drop in the regulator coil due to its resistance and air inductance.

The principle of my novel compensating circuit is to provide an impedance which duplicates the air inductance and resistance of the regulator coil and place this impedance in series with the regulator coil. This impedance is now essentially a measuring device which will exactly duplicate the voltage drop which appears on the regulator coil. I then impress this voltage upon the primary winding of a transformer and connect the secondary winding of this transformer in series with the contacts and the regulator coil, the induced voltage being in a direction opposite to the measured voltage. The transformer will furthermore have an appropriate turns ratio to exactly match the voltage drop across the measuring circuit and the regulator coil.

More specifically, the secondary winding and the primary winding of the above mentioned transformer can be connected in series with the valve of the make pre-excitation circuit. Hence the voltage across the regulator coil and the measuring impedance will be exactly compensated by the voltage induced in the secondary winding of the above mentioned transformer, and the total voltage across the contact will be zero or a very small value.

Accordingly, another object of my invention is to provide a compensation circuit to compensate for the voltages appearing across the contacts during contact operation which is due to the voltage drop appearing on impedances which are connected in parallel with the contacts.

Another object of my invention is to provide a compensating circuit which automatically compensates for the voltage drop which appears across the saturated regulator coil and is reflected across the electromagnetic switch contacts.

Another object of my invention is to measure the voltage drop due to the by-pass circuit current flowing through the regulator coil and to impress across the electromagnetic switch contacts a voltage of equal amount and opposite phase to maintain zero voltage across the electromagnetic switch contacts.

The maximum output voltage of a given electromagnetic rectifier is obtained by closing the electromagnetic switch contacts at the point where the A.-C. voltage is zero and becoming positive in an attempt to transfer the maximum A.-C. power of a given polarity to the D.-C. load. However, after closing the contact at zero voltage there is a finite interval of time before the power of the A.-C. source can be impressed upon the D.-C. load. This interval of time is due to the time required to energize the drive magnet of the electromagnetic switch to thereby cause contact engagement and is also due to the time required to saturate the saturable transformer and commutating reactor.

This has been overcome in the past by inserting a D.-C. voltage source in series with the by-pass circuit to thereby initiate current conduction in the by-pass circuit before the time of zero A.-C. voltage and therefore close the contacts when the A.-C. voltage is still at a negative polarity. The time required for closing the switch and saturation of the saturable transformer and commutating reactor will then be the time required for the A.-C. voltage to assume a zero polarity and the maximum A.-C. power will be delivered to the D.-C. load.

A further advantage of decreasing the power factor of the input power is achieved since the reactive voltage drop is avoided.

However, the use of an additional D.-C. source to achieve this end requires additional power, costly components, increased maintenance, and decreases reliability of the over-all rectifier. The principle of my invention is to attain the same results as mentioned above with the use of a D.-C. bias by providing a capacitor in parallel with the diode in the by-pass circuit. This capacitor will then be charged during the interval of time in which the electromagnetic switch is open and by proper adjustment will discharge at a predetermined time before the voltage will decrease to zero. By discharging this capacitor before zero voltage, I then initiate a given by-pass circuit current which will allow A.-C. power to be transferred to the D.-C. source at the time the A.-C. voltage assumes a zero value and maximum power can be delivered at a high power factor for the input power.

It should be noted that the use of a novel capacitor does not require any additional power but merely absorbs a small amount of power from the A.-C. source to be rectified during the time the A.-C. source is at a polarity which is not desired for the D.-C. load. A more practical application of my novel capacitor for pre-energization of the by-pass circuit would require the use of a small diode in series with the capacitor, connected in a direction to allow discharge of the capacitor in the proper direction before the A.-C. source assumes zero voltage and a resistor in parallel with the last mentioned diode which will prevent a high inrush current through the capacitor after disengagement of the electromagnetic switch contacts.

Accordingly, another object of my invention is to provide means to increase the maximum output voltage and power factor of a given electromagnetic rectifier.

Another object of my invention is to provide a capacitor in the by-pass circuit of an electromagnetic rectifier which is so connected as to initiate current flow in the by-pass circuit before the A.-C. source assumes zero voltage.

Another object of my invention is to provide a pre-energizing capacitor in the by-pass circuit of an electromagnetic rectifier which is energized from the main alternating power source during the portion of the cycle in which the power source will not deliver power to the D.-C. load.

Still another object of my invention is to increase the maximum output voltage and power factor capable of a given electromagnetic rectifier by providing a pre-energizing capacitor in parallel with the diode of a bypass circuit, and to provide a parallel connection in series with the capacitor comprising a second diode and a current limiting resistor to prevent inrush current to the capacitor after disengagement of the electromagnetic switch contacts.

It is the function of the saturable transformer to shift the current away from the current path containing the contact and into the by-pass circuit before the contact break interval occurs. However, the saturable transformer which has no function at the make must have its flux completely reversed during the make process in order to allow its proper operation during the break interval.

In the prior art, an A.-C. bias was provided for the saturable transformer which was so adjusted that the saturable transformer did not affect the make process and unsaturated for break operation at an adjusted predetermined time. However, this A.-C. bias of the prior art circuitry had to be adjusted to be of the proper magnitude and phase in order to allow the saturable transformer to operate properly.

This adjustment is a sensitive one and can be a source of considerable trouble in the operation of a rectifier. I now provide the novel use of a simple D.-C. bias for the saturable transformer in which the saturable transformer operation at the break will be inherently correct and the saturable transformer will not in any manner effect make operation with the exception of a delay in the make process.

The principle of this novel invention is to provide a D.-C. bias of a predetermined magnitude for the saturable transformer, and to limit the rise of by-pass current during the make process to the magnitude given by the D.-C. bias until the saturable transformer is saturated. Only after the time at which the saturable transformer saturates can the by-pass current then rise to subsequently operate the electromagnetic switch. Although the make process is delayed until the saturable transformer is saturated, thereby decreasing the maximum output voltage of a given electromagnetic rectifier, this effect can be easily overcome with the use of the novel pre-energizing capacitor as mentioned above to initiate an earlier rise of by-pass current with respect to the input A.-C. voltage.

During the break process, when the total current decreases to the magnitude of the D.-C. bias, the saturable transformer will unsaturate and thus effect a shift of the decreasing load current from the main circuit containing the engaged switch contacts to the by-pass circuit.

Accordingly, another object of my invention is to provide a D.-C. bias for the saturable transformer such that the saturable transformer will not effect make operation and the saturable transformer will operate at the break as dictated only by the magnitude of the D.-C. bias.

Another object of my invention is to provide a D.-C. bias for the saturable transformer such that the saturable transformer flux will be reversed before the make process can be completed.

As discussed above in conjunction with considerations which must be met to fulfill proper rectifier operation, it was pointed out that the movable contact velocity must be at least 20 inches per second. I therefore propose a novel circuitry which can be used in conjunction with an electromagnetic switch which can be of the type shown in copending application Serial No. 491,350 which will supply powerful operating magnetomotive forces for fast operation of the switch.

In the type of electromagnetic switch having in general an opening magnetic structure, a closing magnetic structure, a closing coil and a D.-C. bias, I propose the use of an additional energizing coil on either the opening or closing magnetic structure which is responsive to the energization of the closing coil. Hence, if this novel additional energizing coil is placed on the opening magnetic structure, it will be connected to the closing coil such that energization of the closing coil at the make will cause the additional coil to deenergize the opening magnetic structure. The subsequent energization of the closing coil at the break interval will then cause the novel energizing coil to increase the magnetization of the opening magnetic structure since the potential appearing across the closing coil will now be opposite to what it was during the make interval. Therefore the additional energizing coil of my novel invention provides bucking action of the magnetic flux in the opening structure when it is desired to close the contact and a boosting action in the opening magnetic structure when it is desired to open the contact, thereby providing an extremely fast operating electromagnetic switch.

Accordingly, another object of my invention is to provide circuitry to provide fast action of the electromagnetic switch.

A further object of my invention is to provide an additional coil on the magnetic structure of an electromagnetic switch which is energized in response to the energization of the magnetic structure such that the magnetic action due to the magnetic structures will be enhanced for both opening and closing the electromagnetic switch contact.

Another object of my invention is to provide an additional coil on the opening magnetic structure of an electromagnetic switch which is energized in response to the closing coil such that it will boost the magnetic action of the opening magnetic structure during the break operation and will buck the magnetic action of the opening magnetic structure during the make interval.

In addition to the above mentioned novel circuitry for the electromagnetic switch, I propose the use of a second novel circuit which will give the electromagnetic switch an even more positive action during the make and break interval. This novel circuit is based on the realization that the saturable transformer is unsaturated immediately before it is desired to operate the electromagnetic switch.

The principle of my invention is to couple the saturable transformer to an energizing coil of the electromagnetic switch. Hence during the time the saturable transformers is unsaturated, and has transformer properties, it will induce a strong voltage pulse into the energizing coil of the electromagnetic switch to which it is connected. Obviously, more than one coil of the switch can be energized in response to the unsaturation of the saturable transformer.

By properly connecting a coil on the saturable transformer to an electromagnetic switch coil such as the closing coil, this pulse will be in a proper direction for desired operation of the electromagnetic switch. That is, during the break interval, the pulse induced in the closing coil by the saturable transformer will be in a direction to buck the magnetization of the closing magnetic structure.

During the make interval, the pulse induced in the closing coil from the saturable transformer will be in a direction to boost the magnetomotive force of the closing magnetic structure. This operation will be particularly important at low load currents where the additional pulses will assure positive operation of the switch in the absence of high current through the closing coil.

Accordingly, a corollary object of my invention is to provide an auxiliary driving magneto-motive force to the driving magnet of the electromagnetic switch which is responsive to the magnetization of the saturable transformer.

Another object of my invention is to provide sharp magnetizing and demagnetizing pulses to the drive magnet of an electromagnetic switch which are responsive to the magnetization of the saturable transformer to thereby provide positive operation of the electromagnetic switch even under low load conditions.

Regulators using magnetic cores for mechanical rectifiers achieved regulation by presetting the magnetic flux of a saturable reactor which is in series with the by-pass circuit. Hence the by-pass circuit current does not rise until the flux of the regulator core is overcome and contact closure is subsequently delayed with respect to the phase of the input voltage.

In circuits using a saturable transformer to operate at the break to transfer current from the main power circuit and into the by-pass circuit, it is essential that the transfer takes place without any delay if proper break operation is to be achieved. Therefore, if a magnetic core is to be used as a regulator, I have found that the flux of the core must not be reset after the make operation (due to the collapse of current in the by-pass circuit after the make) or a delay will be presented when, at the break, current is transferred into the by-pass circuit by the saturable transformer.

I have been able to overcome this situation by providing an auxiliary winding for the regulator core which carries the main current. Hence, the total ampere turns which oppose the calibrating D.-C. bias (or D.-C. winding which determines voltages regulation) is that due to the main current as well as the by-pass circuit current. Hence, as long as the total ampere turns of the regulator core is greater than a predetermined amount, the D.-C. bias of the regulator core will not reverse the flux and the break process will proceed as if no regulator core were present.

Accordingly, a further object of my invention is to use a regulator of the magnetic core type which is inserted in the by-pass circuit and has an additional winding which carries the load current for preventing reversal of the regulator core flux prior to the contact break interval.

As was previously mentioned in the stated conditions which must be satisfied for proper operation of an electromagnetic rectifier, it is essential that the commutating reactor is so biased during its unsaturated interval for contact protection that the total current through the main winding and hence the current through the contact during the step be as small as possible. I therefore propose the use of an A.-C. bias supply circuit for the commutating reactor which provides an A.-C. bias having the proper magnitude and proper phase to supply the magnetizing current required by the commutating reactor during both the make and the break. Biases or pre-excitation circuits for this purpose are well known in the mechanical rectifier art and the required phase shift has heretofore been supplied by conventional phase shifting transformers and well known devices of that type. These phase shifting devices are, however, expensive, large and difficult to manufacture. I therefore provide a novel phase shifter for the supply of the A.-C. bias of the commutating reactor in which both phase shift and magnitude are easily adjustable.

My novel phase shifter comprises a bridge connected circuit wherein the first pair of arms comprise inductors and the second pair of arms comprise resistors and the inductors are magnetically coupled. By making these components variable, it will be shown hereinafter that the output will be of easily adjustable phase shift or magnitude.

Accordingly, another object of my invention is to provide a novel phase shifting device for the supply of the commutating reactor A.-C. bias having an easily adjustable phase shift and magnitude.

Still another object of my invention is to provide a novel phase shifting device comprising a bridge connected circuit having inductors in the first pair of branches, resistors in the second pair of branches, and magnetic coupling between the inductors of the first pair of branches.

These and other objects of my invention will now become apparent from the following description when taken in connection with the drawings in which:

Figure 1 shows the basic circuit of my invention as a single phase half-wave rectifier and contains the components which must be basic to any electromagnetic rectifier. That is, Figure 1 shows the power source, a D.-C. load, an electromagnetic switch, a saturable transformer, a commutating reactor, a by-pass circuit, a regulator (which is not a basic element), and the novel make pre-excitation circuit which I have described as a new basic element for any electromagnetic rectifier.

Figure 3a shows the voltage current characteristic as plotted against time of the voltage source.

Figure 3b shows the voltage characteristic plotted against time of the saturable transformer main winding.

Figure 3c shows the voltage time characteristic of the commutating reactor main winding.

Figure 3d shows the voltage time characteristic of an inductor in the by-pass circuit.

Figure 3e shows the voltage current characteristic plotted against time for the electromagnetic switch contact.

Figure 3f shows the voltage and current plotted against time for the regulator coil winding in the by-pass circuit.

Figure 3g shows the load voltage plotted against time; and

Figure 3h indicates the common time base for Figures 3a through 3g.

Figure 1:
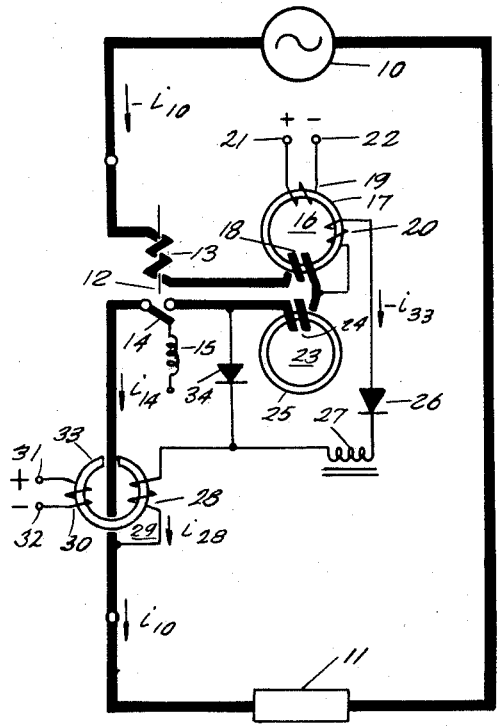
Figure 4:
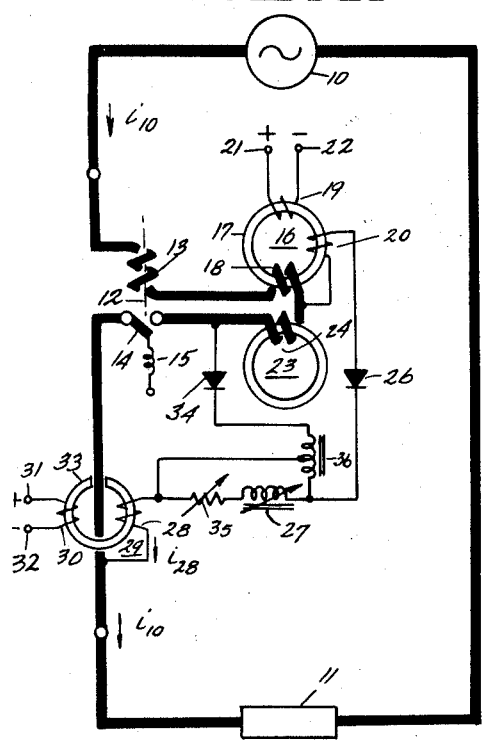

Figure 4 shows the basic circuit diagram of Figure 1 taken in conjunction with my novel compensation circuit which will compensate for the voltage drop across the electromagnetic switch contacts due to the voltage drop on the parallel connected by-pass circuit regulator coil.

Figure 5:
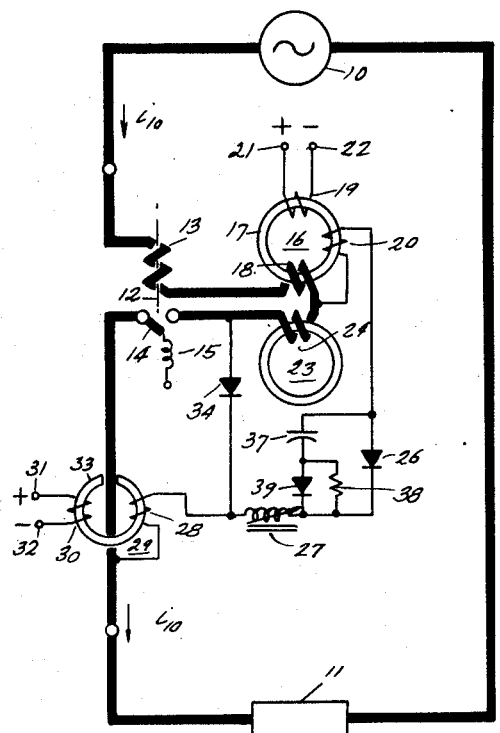

Figure 5 shows the basic circuit of Figure 1 taken in conjunction with my novel feature of a preenergized by-pass circuit to compensate for the overall voltage drop of the rectifier and thereby increase the maximum voltage output and power factor of a given electromagnetic rectifier.

Figure 6:
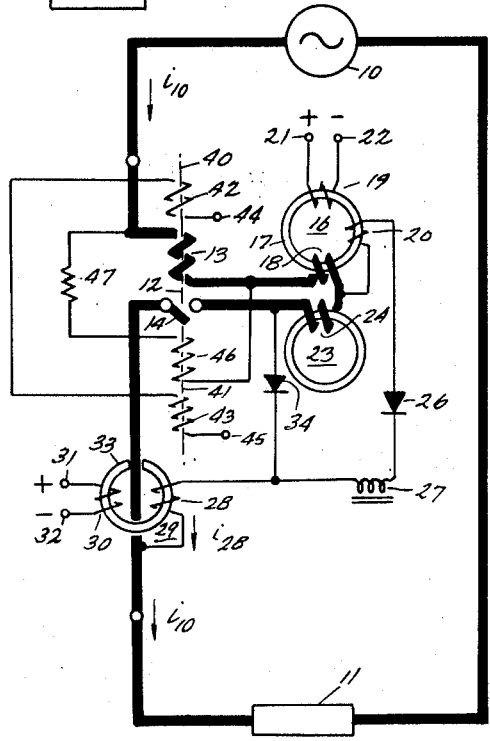

Figure 6 shows the basic circuit of Figure 1 when taken in conjunction with the novel auxiliary winding which is energized from the closing coil of the switch to provide faster make and break operation of the electromagnetic switch.

Figure 7 shows the basic circuit of Figure 1 and shows the novel connection of the closing coil and saturable reactor to thereby provide strong opening and closing pulses for the electromagnetic switch.

Figure 8 shows the basic circuit of Figure 1 with an A.-C. bias on the commutating reactor as supplied by my novel phase shifting circuit.

Figure 9:
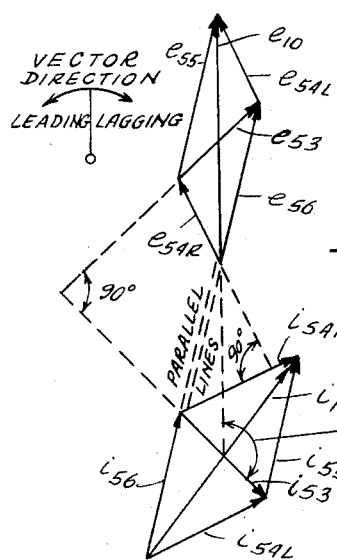

Figure 9 shows a vector diagram of the operation of my novel phase shifting circuit.

Figure 10:
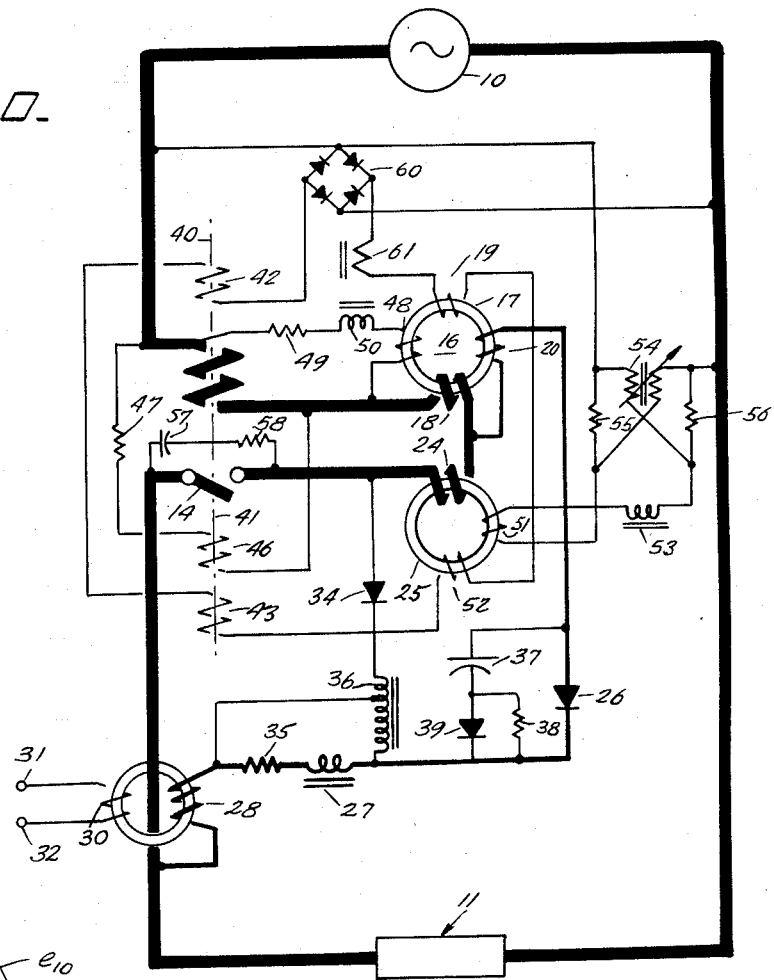

Figure 10 shows the basic circuit of Figure 1 when taken in conjunction with the novel features shown in Figures 4 through 9.

Figures 11a through 11j show the voltage current characteristics of all of the elements of Figure 10 as plotted against a common time base.

Figure 11a shows the current and voltage characteristic of the voltage source.

Figure 11b shows the voltage time characteristic of the electromagnetic switch contacts.

Figure 11c shows the voltage and current time characteristic of the operation of the saturable transformer main winding and the saturable transformer winding lying in the by-pass circuit.

Figure 11d shows the voltage time characteristic of the commutating reactor main winding.

Figure 11e shows the current-voltage characteristic as plotted against time for my novel capacitor which is used to pre-excite by-pass circuit current to thereby allow maximum output voltage and power factor for a given rectifier.

Figure 11f shows the voltage-current characteristic as plotted against time for the by-pass circuit.

Figure 11g shows the voltage time characteristics of both the load voltage and the voltage appearing on the regulator coil winding in the by-pass circuit.

Figure 11h shows the current time characteristic of both the total current flowing through the closing coil of the electromagnetic switch and the current flowing through the saturable transformer winding which is coupled to the closing coil of the electromagnetic switch.

Figure 11i shows the current time characteristic of the current flowing through the novel auxiliary winding on the electromagnetic switch which is coupled to the closing coil.

Figure 11j indicates the common time base for each of Figures 11a through 11i.

Figure 12:
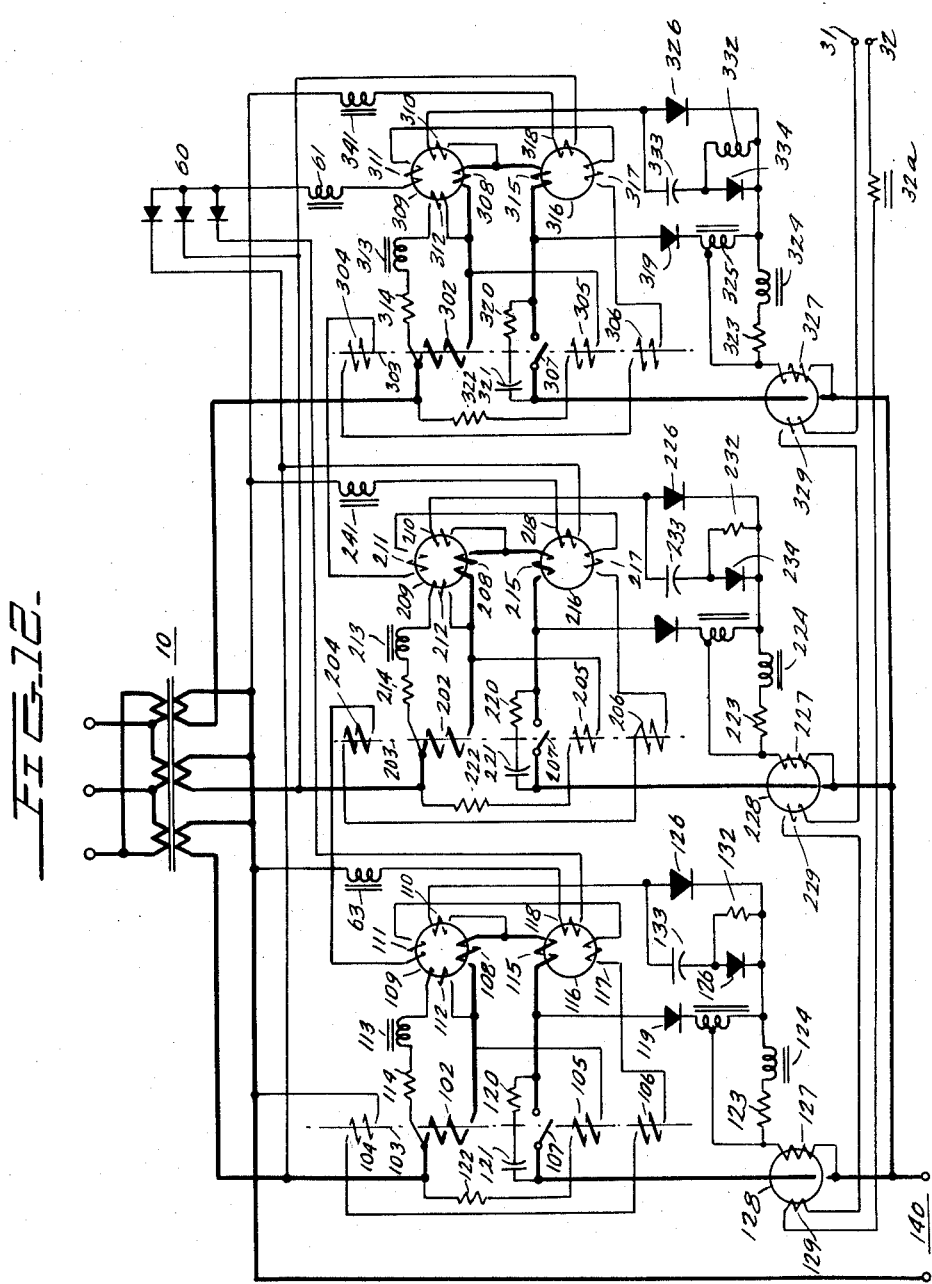

Figure 12 indicates the extension of the basic circuit of Figure 1 and each of the novel features specifically shown in Figures 4 through 8 as applied to a three-phase half wave rectifier.

Basic circuit including make pre-excitation

Figure 2:
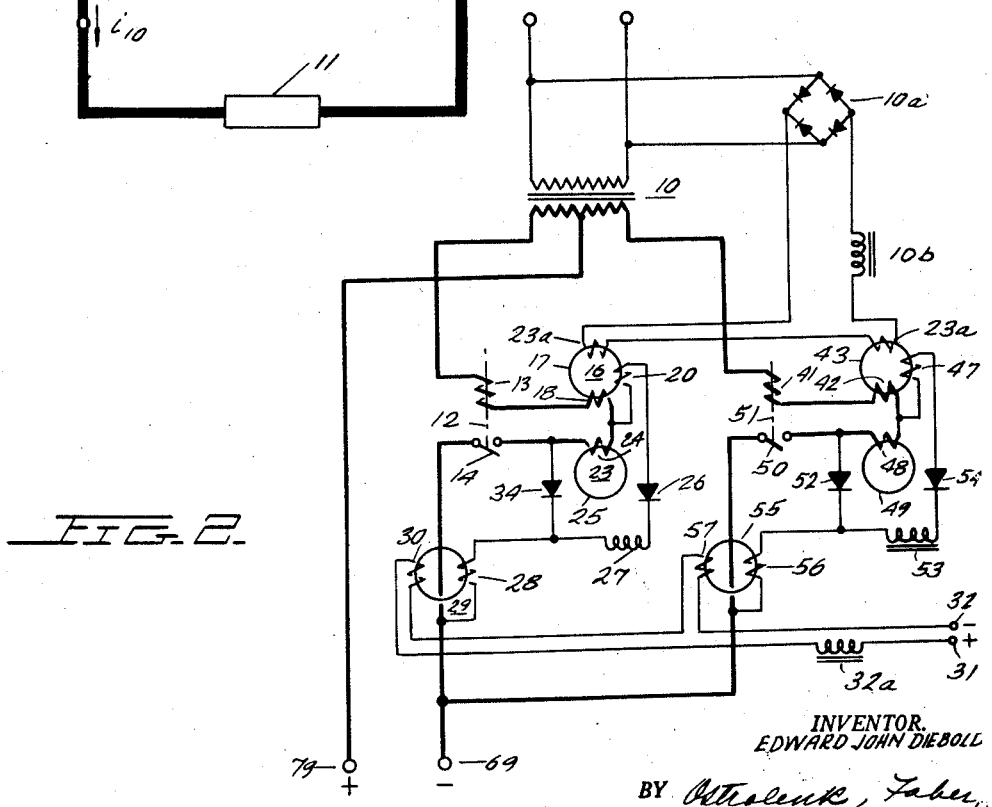
Figure 2 is the same as Figure 1 but is extended to a single phase full wave rectifier.

The basic circuit which comprises all elements which are essential in an electromagnetic rectifier are shown in the circuit diagrams of Figures 1 and 2. It should be noted that the circuit of Figure 2 is identical with that of Figure 1 with the exception of its being a full wave rectifier. Its description and operation will therefore be exactly the same as the following description which will be taken in conjunction with Figure 1.

In Figure 1 the basic components are shown as an A.-C. power source or generator 10, a D.-C. load 11, a drive magnet which comprises a closing magnetic structure 12, a closing coil 13, an electrically conductive armature 14 which is operated into and out of engagement responsive to a magnetic field and an opening bias which is shown in Figure 1 as a biasing spring 15. It is clear that the spring 15 could be replaced by any other type of biasing force such as another magnetic structure. If desired, the armature 30 could be shown as being biased closed and a structure such as magnet structure 12 could operate to defeat the closing bias.

A further basic component is shown as a saturable transformer 16 which comprises a core 17, main winding 18 which is in the main current path, a biasing winding 19, and a winding 20 which is situated in the by-pass circuit. The saturable transformer D.-C. bias is impressed upon winding 19 from a positive terminal 21 and a negative terminal 22. It should be noted that the use of a D.-C. bias for the saturable transformer 16 is novel as was shown above and as will be described more fully hereinafter and that this bias could be of the A.-C. type used in electromagnetic rectifiers of the prior art.

Still another basic component is shown as a commutating reactor 23 which comprises a main winding 24 and an iron core 25 which, similarly to the core 17 of saturable reactor 16, is made of easily saturable material, such as Permeron.

The by-pass circuit which again is a basic element in any electromagnetic rectifier is shown as being in parallel with the electromagnetic switch contact 14 and comprises the series connection of the saturable reactor winding 20, diode 26, inductor 27, and regulator coil winding 28.

Although the regulator is not considered to be an essential element for an electromagnetic rectifier, it has been included in Figure 1 because of its practical importance in a commercial rectifier. More specifically, regulator 29 is shown as comprising the above mentioned winding 28 and a biasing winding 30 which affords voltage control of the rectifier output voltage by varying the D.-C. bias impressed upon winding 30 from the D.-C. terminals 31 and 32. As further shown in Figure 1, the main D.-C. conductor comprises a winding of the regulator core 33 for maintaining forward saturation as long as the current flows through contact 14.

It should be noted that all of the above mentioned basic elements are old, with the exception of the novel regulating system. As mentioned above, I now propose the use of still another basic element which is required for the successful operation of any electromagnetic rectifier. This basic element comprises the novel make pre-excitation circuit shown as diode 34 which is connected in series with the commutating reactor winding 24, the regulator winding 28 and in parallel with the electromagnetic switch contact 14.

In the absence of a regulator, the diode 34 would be connected directly in parallel with the electromagnetic switch 14. However, as will be shown hereinafter, this is essentially the case since the regulator core 33 will be saturated at the time contact 14 is closed and the make preexcitation is required. That is, even with the presence of a regulator, the make pre-excitation circuit is connected directly in parallel with the electromagnetic switch contacts during the time of contact operation.

It should be further noted that although I show my make pre-excitation circuit as comprising a semi-conducting diode 34, that this diode could be replaced by any electronic valve or by any circuit element having an asymmetric impedance characteristic.

The operation of Figures 1 and 2 is now taken in combination with the voltage current characteristics as plotted against time in Figures 3a through 3h for one full cycle of operation. It should be noted that in the Figures 3a to 3h the common time base shown in Figure 3h has been exaggerated for a clearer understanding of the circuit operation.

As seen in Figure 3a at the time t0, the voltage e10 of generator 10 becomes positive and initiates a current through the circuit 13—18—20—26—27—28—11. But because the core 33 of the regulator-transductor 29 is not saturated, the coil 28 has an almost infinitely high impedance, thereby preventing the current to rise to an appreciable value.

The voltage e10 therefore appears on the coil 28, shown in Figure 3f as the voltage e28. The same voltage appears as e14 across the parallel connected contact 14 as shown in Figure 3e.

Between the time t0—t1, the voltage time integral shown in Figure 3f as the triangular area under the voltage e28 is applied to the coil 28 and causes a change in the magnetic flux of core 33. At the time t1, the magnetic flux in the core 33 has reached saturation value, whereupon core 33 saturates and the impedance of winding 28 drops to a very low value. Hence the voltage e28 across the coil 28 disappears suddenly, as shown at time t1 in 3f. The current i28 (or i27) immediately starts to rise, because the generator voltage e10 of Figure 3a no longer is opposed by the voltage e28 on coil 28. The generator voltage e10 now appears on the largest impedance in the circuit which is the current-limiting choke 27 and is shown as the voltage e27 in Figure 3d. Due to the limiting action of choke 27, the current i27 rises gradually after time t1, as shown in Figure 3f.

It should be noted that the currents i27 and i28 shown in Figure 3f are drawn at a much larger scale than the generator current i10 of Figure 3a or the contact current i14 of Figure 3a. Therefore, in the time interval t1—t5, the currents i27 and i10 are equal, and the larger appearance of i27 in Figure 3f as compared to i10 in Figure 3a is due only to the different scales.

When the voltage e27 of Figure 3d rises suddenly at the time t1, the small rectifier 34 of my novel make pre-excitation circuit conducts a current which flows through the winding 24 of commutating reactor 23. Because the core 25 of the commutating reactor 23 is not saturated, the impedance of winding 24 is extremely high, thereby limiting the current through winding 24 and diode 34 to a very low value. The voltage $e27$ thus also appears on the coil 24, shown as $e24$ in Figure 3c. With the coil 24 assuming the voltage-drop shown in Figure 3c, there remains but little voltage $e14$ across the switch 14, as shown in Figure 3e. Actually after $t1$ and until the switch 14 closes at $t4$, the voltage across it is very low, given only by the resistive and inductive drop caused in the coil 28 by the current $i27$. As will be shown hereinafter, I shall provide a circuit to compensate for this additional voltage drop which appears across contact 14.

Therefore, by the simple application of a small rectifier 34 which comprises my novel make pre-excitation circuit and introduces a new basic component for electromagnetic rectifiers, the voltage across the switch 14 is almost zero for an interval beginning before and ending after the switch 14 actually closes.

During the time $t1$—$t2$, the core 17 of the saturable transformer remains saturated by the direct current pre-magnetization supplied by the coil 19 which is fed from a D.-C. supply 21—22. The novel use of a D.-C. bias for the saturable transformer will be explained hereinafter in a more complete manner in conjunction with Figure 6. At the time $t2$, the current $i27$ of Figure 3f flowing through saturable reactor main winding 18 and saturable reactor by-pass winding 20 equals the action of the direct current in winding 19 and the core 17 unsaturates. A high impedance then appears on the coils 18 and 20 which assume the full generator voltage $e10$, as shown in Figure 3b. The level of the direct current $i19$ at which this happens, is shown in Figure 3a, as compared to the generator current $i10$. The voltage $e27$ on choke 27 disappears, since the current $i27$ is prevented from further rise by the action of the coils 18 and 20.

In the time $t2$—$t3$, the voltage $e18$ appearing on the coil 18 effects a complete flux-reversal in the core 17. During the time $t2$—$t3$, the voltage $e24$ on the commutating reactor coil 24 is shown in Figure 3c as being reduced to a lower value because the generator voltage is now applied to the coils 18 and 20 in series.

At the time $t3$, the core 17 of saturable reactor 16 is saturated in a direction opposite to its saturation before $t2$, and thereafter the current $i27$ continues to rise as before.

At the time $t4$, the current $i27$, flowing through 10—13—18—20—26—27—28—11 has risen to such a value that the switch 14 is closed by the magnetic action of the iron core 12 which is magnetized by the coil 13. Actually, the magnetomotive force for statically closing the electromagnetic switch is attained at an earlier time, for example, $t3$, but a certain time is required for the armature to travel the full closing distance. The voltage $e14$ across the switch 14 now collapses to zero, because the switch closes, but this final collapse concerns only a very small voltage as shown in Figure 3e. Before closing, the small voltage appearing across the switch is due to the voltage drop in the aircore reactance of the coil 28 (the iron core 33 being saturated at $t1$) and the ohmic resistance of the winding 28 submitted to the current $i27$ shown in Figure 3f.

When the switch 14 is closed, there is no change in the behavior of voltages and currents in the circuit. As before, the generator voltage still appears on the commutating reactor winding 24, shown as $e24$ in Figure 3c, on the parallel choke 27, shown as $e27$ in Figure 3d. Because there is no voltage on the switch 14 while it closes, there will be no inrush current. The only current flowing through 14 would come from the commutating reactor coil 24 and this has an exceedingly high impedance at the time $t4$ because the core 25 is not saturated. This current, however, can be compensated for by well known biasing circuits such as shown in U.S. Patent No. 2,693,569.

At the time $t5$, the core 25 finally saturates, and therefore the impedance of the coil 24 suddenly vanishes. The voltage $e27$ on choke 27, which is in parallel with the coil 24, vanishes also and the generator voltage $e10$ which until time $t5$ was applied to the rectifier system, suddenly appears on the load 11 as $e11$ shown in Figure 3g. The current $i14$ through the electromagnetic switch 14 (shown in Figure 3e) increases suddenly, and hence the current $i10$ is delivered by the generator 10 to the load 11 (shown in Figure 3a). Note that a small amount of current $i10$ flows in the time interval $t1$—$t4$, this is nothing but the current $i27$ flowing through the by-pass circuit as shown in Figure 3f. After $t5$, the current $i27$ decays slowly according to the inductance-resistance characteristics of the by-pass circuit. A decaying voltage appears on choke 21 as shown as voltage $e27$ in Figure 3d which reflects the decay of the current $i27$ of Figure 3f.

The voltage $e11$ appears on the load 11 as a rectified sine wave with its beginning point at $t5$, delayed from the theoretical point $t0$ and its ending point $t7$ delayed from the theoretical point $t6$. Due to this delay, the average direct voltage output is less than the highest theoretical average. This is mainly due to the deliberate delay introduced by the transductor-regulator coil 28 and its core 33.

Varying the control current of the transductor control 30 will vary the amount of flux displaced by it, hence the amount of flux which has to be displaced in the opposite direction by the generator voltage $e10$ when appearing on the coil 28 as $e28$ in the time interval $t0$—$t1$. By this means, the output voltage of the rectifier can be controlled easily with a control current which is very small.

In order to prevent a reversal of the flux in the core 33 during the time $t5$ to $t7$ when current flows through the switch 14 and not through the by-pass 20—26—27—28, the core 33 is situated around the main conductor which leads the rectifier to the D.-C. load 11.

When compared to my copending application Serial No. 257,398, the above-described procedure is essentially different for the operation of the commutating reactor and the saturable transformer at the Make. However, the operation of the electromagnetic switch and of the regulator-transductor remain unchanged in principle. Operation at the Break is almost unchanged from before and is as follows:

In Figure 3a, when the generator voltage $e10$ becomes zero and reverses its direction at the time $t6$, the current $i10$ in generator and load decreases towards zero. At the time $t7$, this voltage has reached the level of $i19$ shown in Figure 3a or more specifically, the ampere turns of $i10$ in the coil 18 become equal to the ampere turns of the direct current $i19$ in coil 19. Therefore, the core 17 suddenly unsaturates and its impedance changes from an almost zero or negligible value to almost infinite value, i.e. a value larger than any other impedance in the circuit.

Suddenly the voltage $e19$ of the generator 10 is applied to this high impedance coil 18, shown as $e18$ in Figure 3b. The voltage $e11$ on the load 11 disappears at the same instant. For the short time $t7$—$t8$, the generator voltage remains applied to the coil 18 as shown in Figure 3b. This voltage is transformed into the secondary coil 20 of the saturable transformer having the core 17. The secondary circuit is closed through 20—26—27—28—14—24—20 (diode 34 is opposed to the voltage), and a current starts to rise due to this voltage. This circuit contains almost no impedance because core 33 is still saturated from the forward current flowing through the main line until $t7$, and the commutating reactor core 25 is still saturated from the same current flowing through 24. Thus the current $i27$ starts to rise again as shown in Figure 3f, the only impedance being the choke 27 which limits the rate of rise of the current $i27$, while subjected to the voltage transformed from winding 18 into winding 20. Figure 3d shows the transformed voltage pulse as applied to the choke 27 as e27.

At a time between t7 and t8, the by-pass current i27 has reached the value of the main current at t7. That is, the total main current is now displaced into the by-pass and residual main current through the switch 14 and the coil 24 shown as i14 in Figure 3e reaches zero. A further increase of current i27 which would mean a reversal of the current i14, is prevented by the commutating reactor coil 24 and its core 25 which unsaturates as soon as the line current i14 reaches zero or a value almost equal to zero.

At the time t8, the switch current i14 is zero and the by-pass current i27 is equal to the line current i10 and the core 17 of the saturable transformer saturates thereby ceasing transformer action between the coils 18 and 19. Generator voltage e10 which appeared on the coil 18 tends to reverse the current of the coil 24 but this is prevented by the extremely high impedance of the coil 24 and e10 now appears on the coil 24 and is shown as e24 in Figure 3c.

Current through the switch 14 is limited by the amount of current passed by the commutating reactor coil 24 (the semi-conductor 34 is not subjected to an appreciable reverse voltage at the time, and passes practically no current), this current being shown as i14 after t8 in Figure 3e. By proper design and biasing methods, this residual current, flowing through the switch contacts immediately before opening, can be made extremely small (approximately $\frac{1}{1000}$ of rated line current or less). When the switch opens at the time t9 in Figure 3e, the current interrupted by the switch is of such a small amount as to be of no importance. After opening, the small residual current can flow through the parallel path formed by the rectifier 34 and the coil 28 which has a very low impedance at that time and because the residual current flow is not restricted, the recovery voltage across the contact is very low, as shown by e14 after t8 in Figure 3e.

By-pass current i27 decays slowly after t8, depending on the resistor-inductor constants of the circuit. This is shown as i27 in Figure 3f. Whenever i27 reaches zero, its reversal is prevented by the rectifier 26. Hence the by-pass current stops naturally, without reversing. Total load current flowing through the rectifier is shown as i10 in Figure 3a, its slow decay being a small current (after t8) which is provided by the by-pass current i27.

At the time t10 the commutating reactor core 25 is saturated, and the voltage on coil 24 collapses. Generator voltage e10 shown as e14 in Figure 3e now appears on the open switch which has opened to a sufficient distance to withstand the high voltage.

When the current i27 (or i28) has reached zero, the control current in the coil 28 reverses the flux in core 33 causing the inverse voltage e28 to appear at time t11 in Figure 3f. At the time t12 another identical cycle begins.

Merits of basic circuit

Electrical problems as stated above will be used to evaluate the merits of the basic circuit point by point.

Condition 1. Satisfied, because the contact voltage e30 is lowered substantially before the switch starts closing.

Condition 2. Partially satisfied. In critical cases additional compensation is required to overcome the voltage drop of the coil 36 which might be sufficient to cause a field discharge. The above described circuit however is a great improvement over previously used circuits.

Condition 3. Satisfied.

Condition 4. Not always satisfied. The complete circuit as described in the following, does satisfy this condition.

Condition 5. Satisfied to a much larger extent than by previously used circuits and the complete circuit will still show a further improvement.

Conditions 6, 7, 8, 9, 10 are satisfied as they were in the previously described circuits. These conditions depend mainly upon the quality of the core material of the commutating reactor and the compensation of the magnetizing current by means of the pre-excitation which can be accomplished by careful design and manufacture of all parts.

Condition 11. Not always satisfied. The complete circuit however provides correct operation.

Conditions 12, 13, 14. Satisfied with adequately designed spark-suppressor circuit as will be described in the complete circuit.

Condition 15 is satisfied. This is very important.

Conditions 16 and 17 are not satisfied by the basic circuit but will be satisfied by the complete circuit.

Conditions 18 and 19. Satisfied.

Saturable transformer D.-C. bias

The novel use of a D.-C. bias for the saturable transformer is shown in Figure 1 and comprises the D.-C. source 21—22 and coil 19 on the saturable reactor core 17. As was described, with reference to the above description, the flux reversal of core 17 introduces an additional delay in the closing operation without any apparent result. This, however, is done purposely because the same saturable transformer 16 must control the operation of the rectifier during the break interval. Unless the flux of saturable transformer 16 is completely reversed during the make process, the break will not happen correctly, or, inversely, when the make is not accomplished because the current i27 rises insufficiently then no break is required and saturable transformer 16 does not operate at all. The above described operation is a great advantage over the previously described circuit in which an A.-C pre-magnetization of the saturable transformer was required. In the prior art devices, unless the A.-C. pre-magnetization is correct in amount and in phase, the operation will not occur correctly. Therefore, the necessity of supplying an accurate A.-C. pre-magnetization has been eliminated without any detrimental effect upon the system, except the additional delay in the make operation. This delay however can be compensated by the output voltage compensating device which will be more fully described hereinafter with reference to Figure 5.

Compensation for regulator coil voltage drop

As was mentioned in the description of the basic circuit of Figure 1, an additional voltage drop appears across the contact 14 during the make interval due to the by-pass current i28 flowing through the regulator coil 28 of the saturated regulator core 33.

Referring now to Figure 4, I show a circuit which will provide a compensation for this voltage drop during the make process in conjunction with the basic circuit of Figure 1. As previously mentioned, during the make process a relatively high current flows through the parallel circuit 20—26—27—35 and 28. The voltage drop appearing across the coil 28 also appears across the contact the contact 14. For high current application, this voltage drop might become excessive and cause eventual destruction of the contact 14. The application of my novel compensation circuit depends upon the introduction of the variable resistor 35 and the transformer 36.

If the resistance of resistor 35 and the inductance of the choke 27 are then made proportional to the resistance and inductance of coil 28, and the transformer 36 is made with a ratio of numbers of turns equal to the proportionality between resistor 35 and inductor 27 as compared to the resistance and inductance of regulator coil 28, then the voltage drop across resistor 35 and choke 27 is proportional to the voltage drop across the coil 28. This voltage drop is then impressed upon the primary winding of transformer 36 and transformed into the secondary winding of transformer 36 in such a way that the total voltage and the circuit 14, 28, secondary of 36, 34, and back to 14 is practically zero.

If desired transformer 36 can be provided with an adjustable tap to permit the establishment of a practical zero point by experiment. Similarly inductor 27 can be made variable and the impedance of regulator winding be easily matched (as a ratio) by adjusting the variable components of the circuit.

*Compensation of the overall rectifier voltage drop*

As was previously indicated, the major cause of voltage drop in an electromagnetic rectifier from its maximum value is due to the delay in closing of the contact, or make delay. This delay is due mainly to the time required to magnetize the drive magnet, saturable transformer and commutating reactor.

As the magnetization of these components can be accomplished by a current flowing through the by-pass circuit, a voltage source inserted into this by-pass circuit, thereby causing the by-pass current to start before the generator voltage rises, would greatly shorten the delay or render it nil. Hence a small auxiliary voltage source would increase the voltage output of the whole power system.

In Figure 5, I show a novel means to accomplish this pre-exciting of the by-pass circuit in conjunction with the basic circuit of Figure 1. In Figure 5, the auxiliary voltage source is the capacitor 37 which is charged each cycle by the inverse voltage appearing across the contact 14. The power of the auxiliary voltage supply therefore comes from the generator 10 itself. When the voltage of generator 10 is negative, no current can flow through the rectifier proper since each path of current flow has a blocking element. However, by providing a small resistor 38 in series with capacitor 37, a small current can flow to thereby charge up capacitor 37 positive below and negative above. When the negative voltage of generator 10 decreases there comes a point where the negative voltage of capacitor 37 becomes larger than the voltage of generator 10. Under this condition, a positive current will now flow through the by-pass circuit from capacitor 37 to diode 39, 27, 28, 11, 10, 13, 18, 20 and back to capacitor 37. This means that the make process is initiated before the time at which the generator voltage becomes positive. Therefore, the make will happen earlier and the voltage output of the rectifier will be higher.

*Auxiliary winding drive for the drive magnet*

Figure 6 shows schematically a complete electro magnetic switch of the type described in U.S. Patent No. 2,805,300 issued September 13, 1957 in conjunction with a novel auxiliary winding for positive contact operation. The rectifier circuitry is that of the basic circuit shown in Figure 1.

The electromagnetic switch of Figure 6 now comprises a closing magnetic structure 40, an opening magnetic structure 41, a biasing coil 42 for the closing magnetic structure and a biasing coil 43 for the opening magnetic structure. The biasing coils 42 and 43 can be supplied from a common D.-C. source showing the terminals 44 and 45. I now provide a novel auxiliary winding 46 which is energized through the resistor 47 in response to the energization of closing coil 13. Note that closing coil 13, resistor 47 and auxiliary coils 46 comprise a closed electrical circuit.

The operation of this novel drive system is as follows: When the closing coil 13 is energized before and during the make process, a relatively high voltage drop appears across it. A current proportional to the voltage then flows through resistor 47 and coil 46 in such a direction as to counteract the effect of bias winding 43 on the opening magnetic structure 41. Hence during the make process, the opening magnetic structure 41 is demagnetized while the closing magnetic structure 40 is magnetized.

Inversely, immediately before and during the break, the closing coil 13 is once again demagnetized, thereby requiring a voltage drop across it in a reverse direction than the make. This reverse voltage drop causes an opposite current to flow through resistor 47 and coil 46 which now boosts the action of biasing winding 43 thereby resulting in a strong magnetic field of the opening magnetic structure 41 while the closing magnetic structure is demagnetized.

It should be noted that the current flowing in the short circuit comprising closing coil 13, resistor 47 and auxiliary winding 46, is damped down to zero by the action of resistor 47. Different damping constants can be obtained by simply adjusting the value of resistor 47 to obtain the desired "buck-boost" action in the drive magnet structures.

*Saturable transformer drive for the drive magnet*

The saturable transformer 16 in Figure 7 is shown having an auxiliary winding 48 which is coupled to the closing coil 13 of the drive magnet through a resistor 49 and inductor 50. Since the saturable transformer 16 is unsaturated immediately before the make and unsaturated in the opposite direction immediately before the break, a voltage will then cause a current to flow through the circuit comprising the coil 48, inductor 50, resistor 49, drive magnet closing coil 13, and back to winding 48 to thereby provide a strong magnetization of the closing structure through the coil 13 at the make and a strong demagnetization of the closing structure through the closing coil 13 at the break.

Inductor 50 and resistor 49 merely limit these closing and opening current pulses and maintain them long enough to ensure a powerful operation. It is obvious that by the addition of this small auxiliary circuit, a powerful magnetizing pulse and a powerful demagnetizing pulse is sent through the drive magnet closing structure whenever the switch should close or open respectively. This will be particularly important at small loads where the additional pulses assure positive operation of the switch. Whenever the current rises to a value less than the level of the bias in the saturable transformer winding 19, the closing and the opening pulses will cease and in this case the drive magnet will not be sufficiently energized to operate contact 14.

*Phase shifter for the commutating reactor A.-C. bias*

Figure 8 shows the basic circuit of Figure 1 wherein an A.-C. bias for commutating reactor core 25 is supplied from a novel phase shifter which supplies an A.-C. bias of proper phase shift and magnitude. Since commutating reactor 16 has a core 25 of highly saturable iron, the commutating reactor requires a very small but non-negligible current to magnetize it in a forward or reverse direction. During the make step, the magnetization is in the forward direction, hence the magnetizing current is also in the forward direction.

The use of the highly saturable magnetic material, that is, a magnetic material having a square hysteresis loop will make this magnetizing current practically constant. Hence if a current of almost constant magnitude is impressed upon the bias winding 51 it will compensate at least partially for the magnetizing current. Similarly during the break step, the magnetization occurs in the negative direction, hence the magnetizing current is negative. If the current in auxiliary coil 51 is also negative at this time, it will compensate at least partially for the negative magnetizing current. Therefore by adequate adjustment of the A.-C. current flowing through the coil 51 in both amount and phase angle together with the proper number of turns which is determined from the D.-C. bias coil 52 will make it possible to have a very low residual current during both the make and break intervals. It should be noted that both of these residual currents will be slightly positive while the make and break step still occur at the right time and that the bias does not initiate these steps at an unwanted time.

In the case of non-linear behavior of the magnetizing current, more complete compensation can be obtained by the use of straightener circuits such as those described in U.S. Patent No. 2,693,569, assigned to the assignee of the instant application.

Adjustable amplitude and phase angle of the A.-C. bias with respect to the input voltage is obtained in Figure 8 by means of the novel phase shifting circuit comprising the inductor 53 and the phase shifter elements comprising the double inductor 54 and resistors 55 and 56. The purpose of choke 53 is to prevent pulses which are generated in the commutating reactor auxiliary winding 51 from being impressed into the phase shifter circuit.

Operation of the phase shifter circuit of Figure 8 is more specifically described by the vector diagram of Figure 9. Referring now to both Figures 8 and 9, the vector $e10$ represents the voltage of generator 10. A phase shifter network is connected across the generator voltage and consists of the two coil reactor and resistors 55 and 56. Current flowing into the phase shifter is represented by the vector $i10$, in Figure 9.

Since the circuit is resistive and inductive, the current $i10$ lags the voltage $e10$. $e54L$ is the voltage across the left hand coil of reactor 54 in Figure 8 and $e54R$ is the voltage of the reactor on the right hand side of component 54. Due to the transformer effect, these voltages will be equal. Furthermore, the reactor 54 has an iron core with an adjustable air gap to thereby permit the adjustment of the reactance of the coils comprising the reactor 54.

Figure 9 further shows the vector voltages $e55$ and $e56$ as representing the voltages appearing across resistors 55 and 56 in Figure 8. From the circuit diagram it is obvious that:

(1) $\quad e_{10} = e_{54R} + e_{55}$
(2) $\quad e_{10} = e_{54L} + e_{56}$

Referring again to Figure 9, the upper diagram shows the vectorial addition of these voltages. It is shown that resistor voltages $e_{55}$ and $e_{56}$ are equal and in phase and that the reactor voltages $e_{54L}$ and $e_{54R}$ are also equal and in phase. The reactor voltages, however, are shown as leading the resistor voltages.

Referring now to the lower portion of Figure 9, the current additions are shown as:

(3) $\quad i_{10} = i_{56} + i_{54R}$
(4) $\quad i_{10} = i_{55} + i_{54L}$

Since the resistors 55 and 56 are considered to be practically non-inductive, the vectors $i_{55}$, $e_{55}$ and $i_{56}$, $e_{56}$ are parallel, thereby assuming that they are in phase. Since the reactor 54 is considered to be practically non-resistive, it will be observed that vectors $e_{54L}$, $i_{54L}$ and $e_{54R}$, $i_{54R}$ are at right angles. That is, the voltages are assumed to be leading the currents by 90°.

The output of the phase shifter as shown in Figure 8 is fed into the stabilizing choke 53 and the biasing winding 51. As the impedance of coil 51 is highly variable, the stabilizer choke 53 must have an impedance high enough to completely overshadow the impedance of the coil 51. Hence the output of the phase shifter is for all practical purposes only the choke 53.

The output voltage of the phase shifter is determined according to the following equation:

$$e_{53} = e_{56} - e_{54R}$$

$$e_{53} = e_{55} - e_{54L}$$

This can also be obtained by subtracting the vectors in the upper diagram of Figure 9. Similarly, the output current of the phase shifter is determined from the relations:

$$i_{53} = i_{54L} - i_{56}$$

$$i_{53} = i_{54R} - i_{55}$$

This is shown in the lower diagram of Figure 9 in vector relationships. Since choke 53 is assumed to have a negligible resistance, the voltage $e_{53}$ which falls across it will lead the current $i_{53}$ by 90°. The phase shift angle between the input voltage and output current is now shown in Figure 9 according to the above relationships. By varying respective values of resistance for contact reactance or by varying both resistance and reactance together will clearly allow any phase shift or output magnitude which is desired.

*Operation of the complete circuit*

A complete electromagnetic rectifier which will satisfy all of the conditions presented heretofore for a successful electromagnetic rectifier is shown in Figure 10. It should be noted that Figure 10 is exactly the same as the basic circuit of Figure 1 plus the additional features shown in each of the Figures 4 through 8. The operation of the complete circuit of Figure 10 will be described in combination with the voltage current characteristics of its various components as plotted against time in Figures 11a through 11j.

Although the operation of the circuit is essentially identical to the basic circuit of Figure 1, the changes which are introduced due to the additional features change the voltage time and current time characteristics sufficiently to necessitate an additional description.

It should be noted that all of the features mentioned heretofore have been in the circuit of Figure 10 but it should be noted that the various features could be used singly or in any combination in a given circuit.

As will be seen when referring to Figure 10, the D.-C. supplies required by the various components is supplied from a common source 60 which has a smoothing choke 61 in series therewith.

Figure 3:
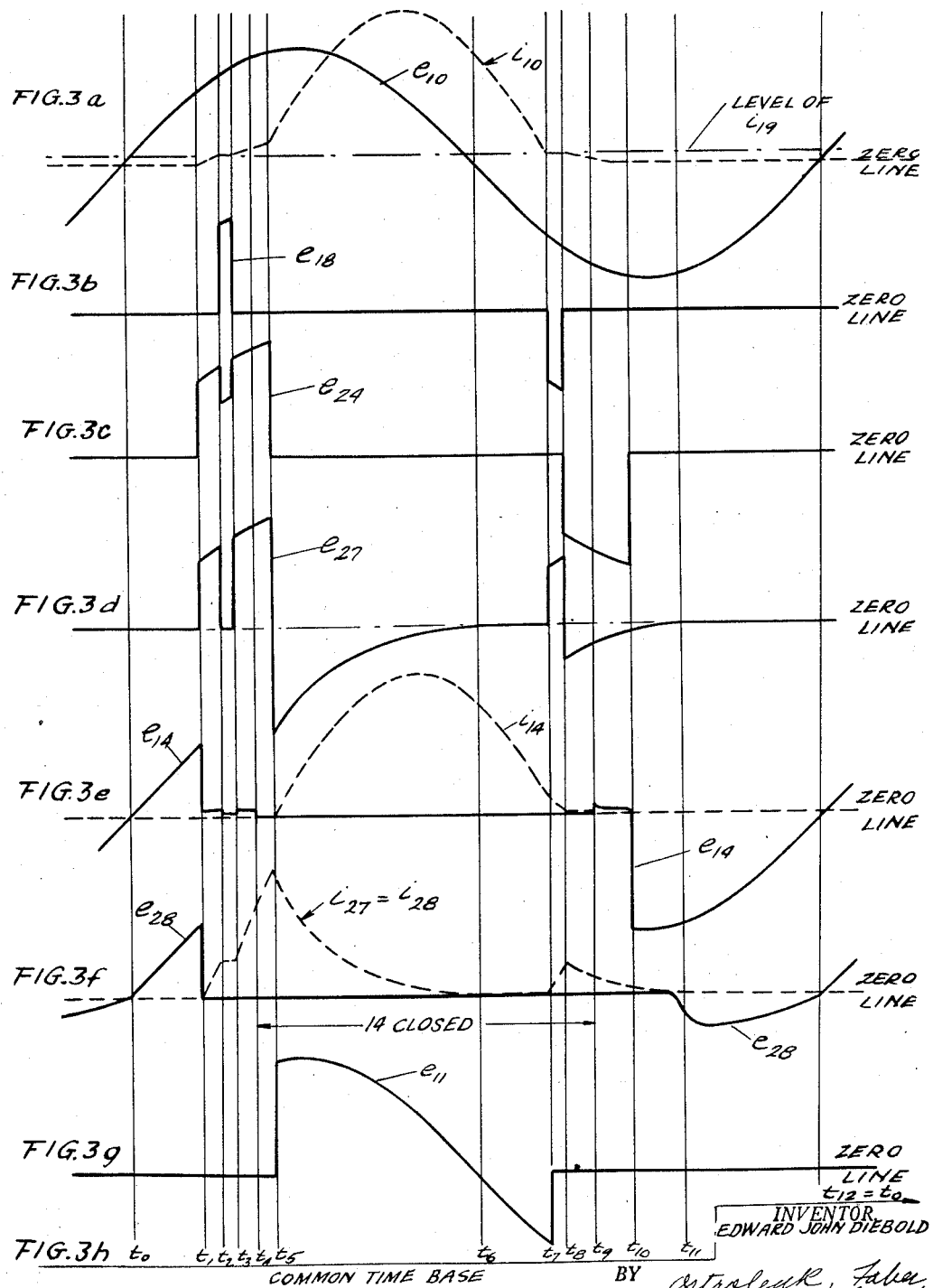
Figures 3a to 3h show the voltage or current characteristics of the various components of Figures 1 and 2 as plotted against a common time base.

Furthermore, for easier representation of the operation before and after $t_0$ or the time at which the generator voltage assumes a zero value, Figure 11 is shown with the cycle split immediately before $+_6$ and not at $t_0$ as was done in Figure 3. Due to the compensation for the overall voltage drop, the actual closing procedure is for the case of Figure 10 initiated before $t_0$. The times preceding that at which the generator voltage assumes a zero value are indicated by the times $t_{-3}$, $t_{-2}$, and $t_{-1}$ in Figure 11j.

The following table indicates comparative times at which the same operations occur for the circuit of Figure 1 as shown in Figure 3 and for the circuit of Figure 10 as shown in Figure 11.

| Operation | Fig. 8 | Fig. 11 |
|---|---|---|
| Zero generator voltage, increasing | $t0$ | $t0$ |
| Begin regulator action | $t0$ | $t-3$ |
| End regulator action | $t1$ | $t-2$ |
| Begin sat. transformer action Make | $t2$ | $t-1$ |
| End sat. transformer action Make | $t3$ | $t1$ |
| Begin make step | $t3$ | $t2$ |
| Make (closing of contact) | $t4$ | $t3$ |
| End of make step | $t5$ | $t4$ |
| Zero generator voltage, decreasing | $t6$ | $t6$ |
| Begin of sat. trans. action break | $t7$ | $t7$ |
| Contact current reaches zero | $t8$ | $t8$ |
| End of sat. transf. action break | $t8$ | $t9$ |
| Begin of break step | $t8$ | $t8$ |
| Break (opening of contact) | $t9$ | $t10$ |
| Bypass circuit current reaches zero | $t11$ | $t11$ |
| End of break step | $t10$ | $t12$ |
| Begin flux reversal regulator coil | $t11$ | $t13$ |
| End flux reversal regulator coil | $t12$ | $t14$ |

Similarly, as was done in Figure 3, the time intervals have been exaggerated as compared to the duration of the whole cycle for easier understanding of the diagram.

*Make process for complete circuit of Figure 10*

At the time $t11$, during the break, the current $i_{20}$ through the by-pass circuit reaches zero and would immediately reverse, were it not for the rectifier 26. A negative voltage, therefore, appears on diode 26, shown as $e_{26}$ in Figure 11f which is equal to generator voltage $e_{10}$ in Figure 11a. The same voltage shown as $e_{38}$ in Figture 11f also appears on the small rectifier 39 and resistor 38 because the capacitor 37 is uncharged. Due to this voltage a small current $i_{37}$ of Figure 11e flows through the resistor 38, causing a charging voltage $e_{37}$ on the capacitor 37 as is also shown in Figure 11e. The reverse voltage $e_{26}$ follows the generator voltage $e_{10}$ of Figure 11a and the capacitor voltage $e_{37}$, shown in Figure 11f as a dot-dash line, gradually increases with the rate of increase given by resistance of resistor 38. At the time $t$–3, the capacitor voltage $e_{37}$ equals the reverse voltage $e_{26}$ and after $t$–3 will be even larger.

After time $t$–3, a voltage is impressed in the circuit 10—13—18—20—37—39—27—35—28—11—10 due to two sources, the impressed voltage $e_{10}$ of the generator and the stored voltage $e_{37}$ of the capacitor. The sum of these two voltages, shown by the dotted line which indicates $e_{10}+e_{37}$ in Figure 11c, is positive because $e_{37}$ is larger than $e_{10}$, and therefore a positive current starts flowing through this circuit. This is equivalent to a generator voltage turning positive at the time $t$–3. Current rising in the by-pass circuit is shown as dotted line $i_{20}$ in Figure 11f.

Between the time $t$–3 and $t$–2, the by-pass current $i_{20}$ is limited by the regulator coil 28, the core 33 of which must be saturated in the forward direction before it passes an appreciable current. Flux reversal of the core 33 was previously accomplished by reverse current in coil 30 during time $t13$—$t14$ and is shown by the reverse voltage $e28$ which is the dotted line of Figure 11g. Flux change in the forward direction is accomplished by capacitor voltage $e_{37}$ appearing between $t$–3 and $t$–2 on coil 28 as $e_{28}$ in Figure 11g.

The example shown in Figure 10 was purposely drawn for a case with very little regulation of the voltage. Hence, the flux reversed in core 33 is very small and the delay time $t$–3 to $t$–2 is very short. For lower voltage output, this delay can be increased by any desired amount.

At the time $t$–2, core 33 saturates and by-pass current $i_{20}$ rises freely as shown by the dotted line in Figure 11f. The by-pass current is equivalent to capacitor discharge-current $i_{37}$ shown by the dotted line of Figure 11e and to current in the main line $i_{10}$ which is shown by the dotted line in Figure 11a during this part of the cycle. Discharge-current $i_{37}$ causes decrease of capacitor voltage $e_{37}$ as shown in Figure 11e.

When the by-pass current $i_{20}$ of Figure 11f, flows through coils 18 and 20 in series, it reaches a value equivalent to the D.-C. bias current in coil 19 at time $t$–1 and core 17 of the saturable transformer unsaturates. This is identical to the operation described for the basic circuit. The by-pass current $i_{20}$ is now maintained constant by the saturable transformer as shown in Figure 11f. The sum of voltages in the circuit, which are $e_{10}$ and $e_{37}$ and are shown as a dotted line in Figure 11c is applied to the saturable transformer, and is shown in Figure 11c as $e_{18}+e_{20}$.

Voltage suddenly appearing on coils 18 and 20 at time $t$–1 is transformed into coil 48, giving rise to a circulatory current $i_{48}$ (dotted line in Figure 11h) in the closed loop 48—50—49—13—48. Circulatory current $i_{48}$ is added to previous current $i_{20}$ in coil 13, as shown in Figure 11h by the sharp rise of $i_{13}$ in the time interval $t$–1 to $t1$. Rise of current in coil 13 causes a voltage drop across it which in turn generates a current $i_{47}$ of Figure 11i through the resistor 47 and the coil 46.

Combined action of the current $i_{13}$ in coil 13 and $i_{47}$ in coil 46 results in a strong attraction of the movable armature 14 towards the coil 13 which magnetizes in the same direction as the bias coil 42 and a strong repulsion of the movable armature 14 away from the coil 46 which magnetizes in the opposite direction of the bias coil 41. Armature 14 then starts to move from the open towards the closed-position.

At the time $t1$ and saturable transformer core 17 is fully saturated. Current $i_{20}$ through coils 18 and 20 can rise again, now being supplied from a positive generator voltage $e_{10}$, whereas the capacitor voltage $e_{37}$ decays rapidly and reaches zero at $t2$.

As long as the capacitor 37 was charged, a discharge current through the circuit 37—39—36—34—24—20—37 was prevented by the rectifier 34. At the instant $t2$, when $e_{37}$ reaches zero, a current starts flowing through rectifier 34 through the circuit 10—13—18—24—34—36—28—11—10 since the impedance of this circuit is lower than that of the by-pass circuit through 20—26—27—35. Positive current through coil 24, however, causes core 25 to unsaturate immediately thereby limiting the current to a very small value and causing all the voltage of the circuit (the generator voltage $e_{10}$) to appear on coil 24 as shown by $e_{24}$ of Figure 11d.

This means that the left hand side of the coil 24 assumes the potential of the right hand side of 10 and thus the voltage on the contact 14 collapses as shown by $e_{14}$ in Figure 11b.

Only remaining passage of the main current $i_{10}$ is through 10—13—18—20—26—27—35—28—11—10, because current through coil 24 is negligible. Hence the only voltage appearing on the contacts 14 is voltage drop across coil 28 due to the current $i_{20}$. To compensate for this voltage drop, a resistor 35 and a choke 27 are inserted into the by-pass circuit, the ratio of which corresponds to the resistance-inductance ratio of the coil 28 but which is larger in amount than 28. Transformer 36 has a number of turns ratio equivalent to the ratio of magnitudes between 35—27 and 28. Thus the real voltage across contact 14 is only the difference between the voltage drop on coil 28 and the drop of resistor 35 and inductor as transformed negatively by 36. In Figure 11b this is shown as a small voltage $e_{14}$ appearing after $t1$. Practically however the voltage will be imperceptibly small.

In the time interval $t2$—$t4$, the above mentioned conditions remain stationary with the by-pass current steadily increasing as shown in Figure 11f. The generator voltage appears as shown in Figure 11d as $e_{24}$ on coil 24. The currents $i_{13}$ through the coil 13 and $i_{47}$ through coil 46 remaining approximately constant, thereby maintaining a constant force upon the armature 14, across which the voltage $e_{14}$ is approximately zero.

A spark suppressor circuit comprising the capacitor 57 and resistor 58 is shown in Figure 10 as being connected directly across the electromagnetic switch contact 14. Capacitor 57 which was charged negatively during the time $t12$ to $t1$ discharges itself through the resistor 58 because the voltage across the switch 14 is zero.

When the armature 14 has travelled the full closing distance, it closes at the time $t3$. As it closes there will be not voltage across it, and inrush current will not flow. Even if the contact bounces there will be no arc and no recovery voltage. That is to say that the A.-C. bias current in coil 51 and the D.-C. bias in coil 52 can be adjusted to compensate for the magnetizing current of core 25 to make this residual current negligibly small, assuring not only a voltage-less but also a current-less closing of the contact.

At the time $t4$ the core 25 saturates and a low impedance path is now provided in the circuit 10—13—18—24—14—11—10 and the current rises freely as shown by $i_{24}$ in Figure 11d. The by-pass current $i_{20}$ now decays gradually according to the inductance and resistance of 35 and 27.

Voltage across the load $e_{11}$ appears suddenly at the time $t4$, because almost all the impedance of the rectifier has been short-circuited, such that the load voltage $e_{11}$ equals the generator voltage $e_{10}$ as shown in Figure 11g.

*Break process for complete circuit of Figure 10*

At the time $t6$ the current $i_{10}$ in the main line as shown in Figure 11a decreases and reaches the unsaturation level of the saturable transformer at the time $t7$.

Similarly, the unsaturation level of the saturable transformer at the make is the level at the break as given by the D.-C. bias of the coil 19. Hence when the ampere-turns of coils 18 and 19 become equal, the core 17 unsaturates and the impedance of the coil 18 suddenly assumes a very high value. The generator voltage $e_{10}$ shown as $e_{11}$ in Figure 11g which was applied to the load is suddenly transferred to the higher impedance of the coil 18 as shown in Figure 11c as $e_{18}$. Further reduction of the line current $i_{10}$ of Figure 11a proceeds at a lower rate. Voltage appearing on coil 18 is transformed into the coil 20, giving rise to a circulatory current $i_{20}$ of Figure 11f which flows through the circuit 20—26—27—35—28—14—24—20. Circulatory current $i_{20}$ opposes the main current $i_{24}$ flowing through the coil 24 and the contact 14, so that $i_{24}$ decreases very rapidly to zero, as seen in Figure 11d.

At the time $t8$, the current $i_{24}$ has reached zero and the current $i_{20}$ has reached the value of $i_{10}$ in the generator as shown in Figures 11a, 11d and 11f. Now the core 25 of the commutating reactor unsaturates causing the impedance of coil 24 to become almost infinite and the current $i_{24}$ therefore remains at the zero value and the voltage $e_{24}$ across the coil 24 rises sharply, as shown in Figure 11d. The by-pass current $i_{20}$ on the other hand, is stopped in its rise and is now equal to the main current $i_{10}$ as shown in Figures 11a and 11f.

During the time interval $t7$—$t9$, the voltage appearing on the saturable transformer coils 18 and 20, shown as $e_{18}$ in Figure 11c, is transformed into coil 48. This voltage is opposed to the voltage appearing during the make and generates a current $i_{48}$ in the circuit 48—50—49—13—48, which opposes the main current as seen in Figure 11h. Total current flowing through the drive magnet coil 13, shown as $i_{13}$ in Figure 11h, is decreasing sharply after the time $t7$, even turning negative after $t8$. At the same time, decreasing current in coil 13 induces a negative voltage on its terminals (coil 13 is almost a pure inductor), which in turn generates a negative current $i_{47}$ through the coil 46. Current $i_{13}$ in coil 13 and current $i_{47}$ in coil 46 both contribute to demagnetize the closing pole 40 and magnetize the opening pole 41 of the drive magnet, causing a positive and powerful action upon the armature 14. At the time $t10$, the armature has overcome its inertia and opens the circuit.

Current flow through the armature is prevented by the commutating reactor coil 24 during the time interval $t8$—$t12$, as the magnetizing current of core 25 is supplied by the D.-C. bias 52 and the A.-C. bias 51. Therefore the residual current through the armature is negligible as (shown by $i_{24}$ in Figure 11d).

The small residual current which does flow through armature 14 during the actual break at the time $t10$ however finds a low impedance by-pass through the spark suppressor circuit 57—58.

Current $i_{20}$ through the by-pass circuit finally reaches zero at the time $t11$ as shown in Figure 11f and reversal of this current is prevented by the semi-conductor rectifier 26.

Extension to three phase systems

It is now obvious that the circuitry described heretofore with reference to a single phase half wave unit or a single phase full wave unit can now be easily extended to the case of the three-phase half wave unit as shown in Figure 12.

In this figure, which contains all the elements of 10, all like elements have similar numbers and a cursory inspection of Figure 12 shows that is merely the application of the single phase half wave circuit of Figure 10 repeated three times. This circuit diagram could similarly be extended to the case of a three-phase full wave rectifier. It is similarly true that the basic circuit of Figure 1 and each of the novel elements shown specifically in Figures 4 through 8 could be applied to any connection for an electromagnetic rectifier.

There is, however, one minor difference between the circuits of Figure 10 and Figure 12. In Figure 12, it will be noted that the A.-C. bias phase shifter was deleted because advantage has been taken of the three-phase arrangement to supply through the smoothing choke 63 A.-C. bias power out of phase with the main voltage. The operation of the particular three-phase half wave circuit shown in Figure 12 will be obvious to any one skilled in the art and having knowledge of the operation of a single phase half wave rectifier shown and described with Figure 10.

Although I have described preferred embodiments of my invention, it will now be obvious that many variations and modifications may be made by those skilled in the art and I therefore prefer to be limited, not by the specific disclosure herein, but only by the appended claims.

I claim:

1. In an electromagnetic rectifier for energizing a D.-C. load from an A.-C. source, an electromagnetic switch having a first and second contact and operating means to operate said first and second contact into and out of engagement in synchronism with the frequency of said A.-C. source, a by-pass circuit, a commutating reactor having a core of easily saturable type material and a winding, at least said A.-C. source, electromagnetic switch first and second contacts, commutating reactor winding and D.-C. load forming a closed series connection when said first and second contact are in the engaged position, said by-pass circuit containing a first valve means connected in series with said A.-C. source and a regulating means comprising a regulating core and a winding and in parallel with said first and second contact and having circuit connections for energizing said electromagnetic switch operating means for effecting contact closure at a predetermined time; a make pre-excitation circuit comprising a second valve; said second valve being connected in series with said commutating reactor during the make process and being connected in parallel with said first and second electromagnetic switch contacts to form a closed series connection of said first and second electromagnetic switch contacts and said regulating core winding, the voltage appearing on said first and second contacts at the make being the forward voltage drop of said second valve.

2. In an electromagnetic rectifier for connecting an A.-C. source to a D.-C. load comprising a pair of contacts being constructed to move into and out of engagement responsive to the variations of a magnetic field, a commutating reactor having a winding connected in series with said contacts and energizing means for creating a magnetic field for moving said contacts into and out of engagement responsive to the instantaneous value of said A.-C. source; a make pre-excitation circuit, said make pre-excitation circuit comprising a diode connected in series with said commutating reactor winding and in parallel with said pair of contacts, said diode being connected to conduct magnetizing current of said commutating reactor during the make interval.

3. In an electromagnetic rectifier for energizing a D.-C. load from an A.-C. source, an electromagnetic switch having a first and second contact and operating means to operate said first and second contacts into and out of engagement in synchronism with the frequency of said A.-C. source, a by-pass circuit, a commutating reactor having a core of easily saturable type material and a winding, at least said A.-C. source, electromagnetic switch first and second contacts, commutating reactor winding and D.-C. load forming a closed series connection when said first and second contacts are in the engaged position, said by-pass circuit containing a first valve means connected in series with said A.-C. source and a regulating means comprising a regulating core and a winding and in parallel with said first and second contact and having circuit connections for energizing said electromagnetic switch operating means for effecting contact closure at a predetermined time; a make pre-excitation circuit comprising a second valve; said second valve being connected in series with said commutating reactor for carrying magnetizing current of said commutating reactor during the make process and being connected in parallel with said first and second electromagnetic switch contacts to form a closed series connection of said first and second electromagnetic switch contacts and said regulating core winding, the voltage appearing on said first and second contacts at the make being the forward voltage drop of said second valve, and means comprising a measure of the impedance of said regulator winding when said regulator core is saturated for inducing a voltage in said last mentioned closed circuit having an equal magnitude and opposite direction to the voltage drop appearing on said regulator core winding.

4. In an electromagnetic rectifier for energizing a D.-C. load from an A.-C. source, an electromagnetic switch having a first and second contact and operating means to operate said first and second contacts into and out of engagement in synchronism with the frequency of said A.-C. source, a by-pass circuit, a commutating reactor having a core of easily saturable type material and a winding, at least said A.-C. source, electromagnetic switch first and second contacts, commutating reactor winding and D.-C. load forming a closed series connection when said first and second contacts are in the engaged position, said by-pass circuit containing a first valve means being connected in series with said A.-C. source and a regulating means comprising a regulating core and a winding and in parallel with said first and second contact and having circuit connections for energizing said electromagnetic switch operating means for effecting contact closure at a predetermined time; a make pre-excitation circuit comprising a second valve; said second valve being connected in series with said commutating reactor for carrying magnetizing current of said commutating reactor during the make process and being connected in parallel with said first and second electromagnetic switch contacts to form a closed series connection of said first and second electromagnetic switch contacts and said regulating core winding, the voltage appearing on said first and second contacts at the make being the forward voltage drop of said second valve, said last mentioned closed series circuit containing a resistor and inductor connected to carry the by-pass circuit current and a transformer positioned to carry the current of said make pre-excitation circuit, the impedance of said resistance and inductance being proportional to the air impedance of said regulator winding; the voltage drop on said resistor and inductor being impressed on the primary of said transformer, the secondary winding of said transformer being constructed to impress a voltage of equal magnitude and opposite phase of that appearing on said regulator winding into said last mentioned closed circuit.

5. In an electromagnetic rectifier of the type having a make pre-excitation circuit, by-pass circuit, a regulating core having a winding and electromagnetically operated contacts wherein by-pass circuit current flowing through said regulator winding achieves operation of said contacts, said contacts, make pre-excitation circuit, and regulator winding forming a closed series circuit; a means to compensate for the voltage drop due to by-pass circuit current through the regulator winding comprising measuring means for measuring the said voltage drop and inserting the substantially same voltage as appears on the said regulator winding on the said closed series circuit in a direction to compensate for the voltage drop on the said regulator winding to thereby reduce the voltage appearing across said contacts to a substantially zero value.

6. In an electromagnetic rectifier of the type having a make pre-excitation circuit, by-pass circuit, a regulating core having a winding and electromagnetically operated contacts wherein by-pass circuit current flowing through said regulator winding achieves operation of said contacts, said contacts, make pre-excitation circuit, and regulator winding forming a closed series circuit; a means to compensate for the voltage drop due to by-pass circuit current through the regulator winding; said means comprising an impedance which is proportional to the air impedance of said regulator winding being connected in series with said by-pass circuit winding, the voltage drop on said measuring impedance being applied to the primary winding of a transformer and inserting the substantially same voltage as appeared on the said regulator winding in a direction to compensate for the voltage drop on the said regulator winding by means of the secondary winding of said transformer thereby reducing the voltage appearing across said contacts to a substantially zero value.

7. In an electromagnetic rectifier for energizing a D.-C. load from an A.-C. source comprising an electromagnetic switch having contacts movable into and out of engagement responsive to a magnetic field and means for creating said magnetic field in synchronism with the frequency of said A.-C. source, a commutating reactor having a core of saturable type material and a winding and a by-pass circuit; said by-pass circuit containing a diode and having circuit connections for energizing said means for creating the said magnetic field for moving said contacts into the said engaged position, said by-pass circuit conducting current after the potential of said A.-C. source is in the direction desired for energization of said D.-C. load; a pre-energizing means for passing current through said by-pass circuit prior to the time at which by-pass circuit current can be initiated by said A.-C. source; said pre-energizing means comprising a capacitor connected in parallel to said by-pass circuit diode.

8. In an electromagnetic rectifier for energizing a D.-C. load from an A.-C. source comprising an electromagnetic switch having contacts movable into and out of engagement responsive to a magnetic field and means for creating said magnetic field in synchronism with the frequency of said A.-C. source, a commutating reactor having a core of saturable type material and a winding and a by-pass circuit; said by-pass circuit containing a diode and having circuit connections for energizing said means for creating the said magnetic field for moving said contacts into the said engaged position, said by-pass circuit conducting current after the potential of said A.-C. source is in the direction desired for energization of said D.-C. load; a pre-energizing means for passing current through said by-pass circuit prior to the time at which by-pass circuit current can be initiated by said A.-C. source; said pre-energizing means comprising a capacitor connected in parallel to said by-pass circuit diode, said capacitor being charged by the inverse voltage of said A.-C. source appearing across said by-pass circuit diode, the voltage of said capacitor exceeding the inverse voltage of said A.-C. source at a predetermined time to thereby initiate by-pass circuit current before said A.-C. source inverse voltage becomes zero.

9. In an electromagnetic rectifier for energizing a D.-C. load from an A.-C. source comprising an electromagnetic switch having contacts movable into and out of engagement responsive to a magnetic field and means for creating said magnetic field in synchronism with the frequency of said A.-C. source, a commutating reactor having a core of saturable type material and a winding and a by-pass circuit; said by-pass circuit containing a diode and having circuit connections for energizing said means for creating the said magnetic field for moving said contacts into the said engaged position, said by-pass circuit conducting current after the potential of said A.-C. source is in the direction desired for energization of said D.-C. load; a pre-energizing means for passing current through said by-pass circuit prior to the time at which by-pass circuit current can be initiated by said A.-C. source; said pre-energizing means comprising a capacitor connected in series with a parallel connection of a diode and a discharging resistor, said circuit comprising said last mentioned capacitor, resistor and diode being connected in parallel with said by-pass circuit diode.

10. In an electromagnetic rectifier for energizing a D.-C. load from an A.-C. source comprising an electromagnetic switch having contacts movable into and out of engagement responsive to a magnetic field and means for creating said magnetic field in synchronism with the frequency of said A.-C. source, a commutating reactor having a core of saturable type material and a winding and a by-pass circuit; said by-pass circuit containing a diode and having circuit connections for energizing said means for creating the said magnetic field for moving said contacts into the said engaged position, said by-pass circuit conducting current after the potential of said A.-C. source is in the direction desired for energization of said D.-C. load; a pre-energizing means for passing current through said by-pass circuit prior to the time at which by-pass circuit current can be initiated by said A.-C. source; said pre-energizing means comprising a capacitor connected in series with a parallel connection of a diode and a discharging resistor, said circuit comprising said last mentioned capacitor, resistor and diode being connected in parallel with said by-pass circuit diode said capacitor being charged by the inverse voltage of said A.-C. source appearing across said by-pass circuit diode, the voltage of said capacitor exceeding the inverse voltage of said A.-C. source at a predetermined time to thereby initiate by-pass circuit current before said A.-C. source inverse voltage becomes zero, said parallel connected diode and resistor preventing a high charging current in said capacitor.

11. In electromagnetic rectifiers of the type having a by-pass circuit for initiating contact closure, said by-pass circuit having a diode therein; a circuit to initiate by-pass circuit current at a time prior to the normal initiation of the said by-pass circuit current comprising a capacitor being connected in parallel with said by-pass circuit diode, said capacitor being charged when inverse voltage appears on said diode and discharging at a predetermined time when the voltage of said capacitor exceeds the voltage on said by-pass circuit diode.

12. In electromagnetic rectifiers of the type having a by-pass circuit for initiating contact closure, said by-pass circuit having a diode therein; a circuit to initiate by-pass circuit current at a time prior to the normal initiation of the said by-pass circuit current comprising a capacitor connected in series with a parallel connection of a diode and a discharge resistor, said circuit being connected in parallel with said by-pass circuit diode, said capacitor being charged when inverse voltage appears on said diode and discharging at a predetermined time when the voltage of said capacitor exceeds the voltage on said by-pass circuit diode; said discharge resistor and capacitor preventing a high inrush current to the said capacitor.

13. In an electromagnetic rectifier for energizing a D.-C. load from an A.-C. source and comprising an electromagnetic switch having a winding and a pair of cooperable contacts, a commutating reactor having a core of saturable type material, a main winding and a by-pass circuit winding, a saturable transformer having a core of saturable type material, a main winding and an auxiliary winding and a by-pass circuit; said A.-C. source, cooperable contacts, electromagnetic switch winding, commutating reactor main winding, saturable transformer main winding and D.-C. load being connected in series when said cooperable contacts are in said engaged position; said cooperable contacts being movable between an engaged and disengaged position responsive to the energization of said electromagnetic switch winding; said by-pass circuit having circuit connections including said A.-C. source, electromagnetic switch winding and saturable transformer auxiliary winding for energizing contact engagement and disengagement responsive to an instantaneous value of the voltage of said A.-C. source; said saturable transformer being unsaturated prior to said contact disengagement; a series connection comprising said saturable transformer auxiliary winding and said electromagnetic switch winding, said series connection being connected to have the voltage appearing on said saturable transformer winding when said saturable transformer is unsaturated prior to the break interval to be in an opposing relationship with the voltage appearing on the said electromagnetic switch winding.

14. In an electromagnetic rectifier for energizing a D.-C. load from an A.-C. source and comprising an electromagnetic switch having a winding, a pair of cooperable contacts, a closing winding and an opening means, a commutating reactor having a core of saturable type material, a saturable transformer having a core of saturable type material and a main winding and a by-pass circuit winding and a by-pass circuit; said A.-C. source, cooperable contacts, electromagnetic switch closing winding, commutating reactor winding, saturable reactor main winding and D.-C. load being connected in series when said cooperable contacts are in said engaged position, said cooperable contacts being movable to the engaged position upon energization of said closing winding and movable to the disengaged position by said opening means responsive to de-energization of said closing winding; said by-pass circuit having circuit connections including said A.-C. source, electromagnetic switch closing winding, and saturable transformer auxiliary winding for energizing contact engagement and disengagement responsive to an instantaneous value of the voltage of said A.-C. source; said saturable transformer being unsaturated prior to said contact disengagement, said saturable transformer auxiliary winding being connected to said electromagnetic switch closing winding in a direction to de-energize said switch closing winding responsive to unsaturation of said saturable transformer prior to the break interval.

15. In an electromagnetic rectifier for energizing a D.-C. load from an A.-C. source and comprising an electromagnetic switch having a winding and a pair of cooperable contacts, a commutating reactor having a core of saturable type material, a closing winding and an opening means, a saturable transformer having a core of saturable type material, a main winding and a by-pass circuit winding and a by-pass circuit; said A.-C. source, cooperable contacts, electromagnetic switch closing winding, commutating reactor winding, saturable reactor main winding and D.-C. load being connected in series when said cooperable contacts are in said engaged position, said cooperable contacts being movable to the engaged position upon energization of said closing winding and movable to the disengaged position by said opening means responsive to de-energization of said closing winding; said by-pass circuit having circuit connections including said A.-C. source, electromagnetic switch closing winding, and saturable transformer auxiliary winding for energizing contact engagement and disengagement responsive to an instantaneous value of the voltage of said A.-C. source; said saturable transformer being unsaturated prior to said contact disengagement, said saturable transformer winding being connected in series with a current limiting impedance and said electromagnetic switch closing winding in a direction to de-energize said electromagnetic switch closing winding responsive to unsaturation of said saturable transformer prior to the break interval.

16. In an electromagnetic rectifier for energizing a D.-C. load from an A.-C. source and comprising an electromagnetic switch having a winding, a pair of cooperable contacts, a closing winding and an opening means, a commutating reactor having a core of saturable type material, a saturable transformer having a core of saturable type material and a main winding and a by-pass circuit winding and a by-pass circuit; said A.-C. source, cooperable contacts, electromagnetic switch closing winding, commutating reactor winding, saturable reactor main winding and D.-C. load being connected in series when said cooperable contacts are in said engaged position, said cooperable contacts being movable to the engaged position upon energization of said closing winding and movable to the disengaged position by said opening means responsive to deenergization of said closing winding; said by-pass circuit having circuit connections including said A.-C. source, electromagnetic switch closing winding, and saturable transformer auxiliary winding for energizing contact engagement and disengagement responsive to an instantaneous value of the voltage of said A.-C. source; and D.-C. bias means being connected to reverse the flux of said saturable transformer core after said cooperable contacts are moved to the engaged position.

17. In an electromagnetic rectifier for energizing a D.-C. load from an A.-C. source and comprising an electromagnetic switch having a winding, a pair of cooperable contacts, a closing winding and an opening means, a commutating reactor having a core of saturable type material, a saturable transformer having a core of saturable type material and a main winding and a by-pass circuit winding and a by-pass circuit; said A.-C. source, cooperable contacts, electromagnetic switch closing winding, commutating reactor winding, saturable reactor main winding and D.-C. load being connected in series when said cooperable contacts are in said engaged position, said cooperable contacts being movable to the engaged position upon energization of said closing winding and movable to the disengaged position by said opening means responsive to deenergization of said closing winding; said by-pass circuit having circuit connections including said A.-C. source, electromagnetic switch closing winding, and saturable transformer auxiliary winding for energizing contact engagement and disengagement responsive to an instantaneous value of the voltage of said A.-C. source; and a D.-C. energizing means connected to said saturable transformer bias winding for reversing the flux of said saturable transformer after said cooperable contacts are moved to the engaged position.

References Cited in the file of this patent
UNITED STATES PATENTS

| | | |
|---|---|---|
| 2,564,682 | Fisk et al. | Aug. 21, 1951 |
| 2,576,499 | Bowes | Nov. 27, 1951 |
| 2,591,952 | Lucas | Apr. 8, 1952 |
| 2,740,934 | Kesselring | Apr. 3, 1956 |
| 2,746,003 | Wegener | May 15, 1956 |
| 2,756,380 | Diebold | July 24, 1956 |
| 2,770,766 | Kesselring | Nov. 13, 1956 |
| 2,771,577 | Kesselring | Nov. 20, 1956 |
| 2,774,930 | Bixby | Dec. 18, 1956 |
| 2,820,190 | Kesselring | Jan. 14, 1958 |